(12) United States Patent
Vlaovic et al.

(10) Patent No.: US 7,971,047 B1
(45) Date of Patent: Jun. 28, 2011

(54) OPERATING SYSTEM ENVIRONMENT AND INSTALLATION

(75) Inventors: Stevan Vlaovic, San Carlos, CA (US); Richard Offer, San Jose, CA (US); Matthew Alberts, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 811 days.

(21) Appl. No.: 11/900,402

(22) Filed: Sep. 10, 2007

(51) Int. Cl.
*G06F 9/24* (2006.01)
*G06F 15/177* (2006.01)

(52) U.S. Cl. .............. 713/1; 713/2; 713/100; 717/168; 717/170; 717/171

(58) Field of Classification Search .............. 713/1, 2, 713/100; 717/168, 170, 171
See application file for complete search history.

(56) References Cited

U.S. PATENT DOCUMENTS

| | | | |
|---|---|---|---|
| 5,375,241 A | 12/1994 | Walsh | |
| 5,701,487 A | 12/1997 | Arbouzov | |
| 5,708,811 A | 1/1998 | Arendt et al. | |
| 5,946,486 A | 8/1999 | Pekowski | |
| 6,238,290 B1 * | 5/2001 | Tarr et al. | 463/40 |
| 6,542,167 B1 | 4/2003 | Darlet et al. | |
| 6,735,666 B1 | 5/2004 | Koning | |
| 6,779,187 B1 | 8/2004 | Hammond | |
| 7,584,461 B2 | 9/2009 | Plum | |
| 7,810,080 B2 | 10/2010 | Plum et al. | |
| 7,810,082 B2 | 10/2010 | Levenshteyn | |
| 7,818,714 B2 | 10/2010 | Ryan et al. | |
| 7,818,729 B1 | 10/2010 | Plum et al. | |
| 2003/0060188 A1 | 3/2003 | Gidron et al. | |
| 2005/0138193 A1 | 6/2005 | Encarnacion et al. | |
| 2006/0288054 A1 | 12/2006 | Johnson et al. | |
| 2008/0046708 A1 * | 2/2008 | Fitzgerald et al. | 713/2 |
| 2009/0083314 A1 | 3/2009 | Maim | |

OTHER PUBLICATIONS

U.S. Appl. No. 11/746,546, filed May 9, 2007, Stevan Vlaovic et al.
U.S. Appl. No. 11/746,578, filed May 9, 2007, Stevan Vlaovic et al.
U.S. Appl. No. 11/895,518, filed Aug. 24, 2007, Stevan Vlaovic et al.
U.S. Appl. No. 12/027,847, filed Feb. 7, 2008, Richard Offer.
U.S. Appl. No. 12/190,995, filed Aug. 13, 2008, Richard Offer.
U.S. Appl. No. 12/239,558, filed Sep. 26, 2008, Richard Offer.
U.S. Appl. No. 12/354,399, filed Jan. 15, 2009, Richard Offer.
U.S. Appl. No. 12/495,638, filed Jun. 30, 2009, Richard Offer et al.
U.S. Appl. No. 12/639,957, filed Dec. 16, 2009, Richard Offer et al.

* cited by examiner

*Primary Examiner* — Chun Cao
*Assistant Examiner* — Michael J Brown

(57) ABSTRACT

Systems and methods of installing and provisioning an operating system are disclosed. The installing and provisioning of the operating system can be performed in multiple discrete, optional steps, utilizing a repository of various partially or fully defined operating system representations. The operating system representation is optionally generated by determining software resource dependencies and is optionally used to provision an operating system on a target platform in real-time in response to a request. In some embodiments, use of the operating system representation allows the operating system to be installed on the target platform more quickly. The operating system is optionally configured to support a virtual machine.

38 Claims, 14 Drawing Sheets

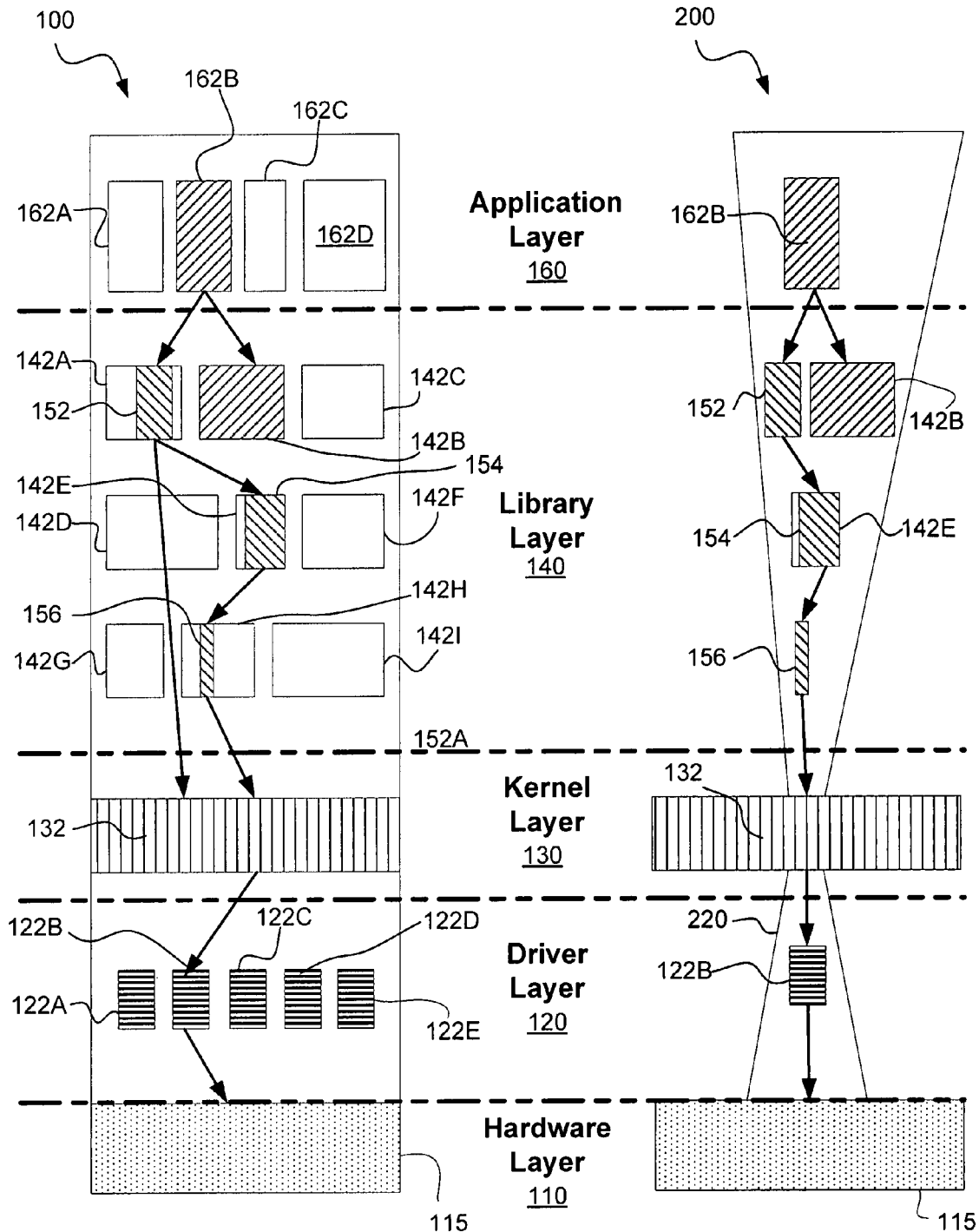

OPERATING SYSTEM ENVIRONMENT AND INSTALLATION

CROSS-REFERENCE TO RELATED APPLICATIONS

This application is related to U.S. patent application Ser. No. 11/746,546 filed May 9, 2007 and entitled "Application Environment Specifications," U.S. patent application Ser. No. 11/746,578 filed May 9, 2007 and entitled "Application Specific Runtime Environments," and U.S. patent application Ser. No. 11/895,518 filed Aug. 24, 2007 and entitled "Optimized Virtual Machine Specification." The disclosures of the above patent applications are hereby incorporated herein by reference.

BACKGROUND

1. Field of Invention

The present application relates to software applications and their environments and more specifically optimized virtual environments for software applications.

2. Related Art

Currently, applications require specific environments in which to execute. For example, applications are usually constructed with a specific operating system environment in mind, and migrating to a different operating system environment requires a different version of the application. In addition to operating system environments, there are also specific hardware requirements associated with applications. At the base level, an application compiled for use on a specific instruction set architecture (ISA) will be unable to execute on a machine with a different ISA.

Commonly used routines are frequently encapsulated in libraries configured to be accessed by applications. These libraries are generally shared among many different applications, allowing the software developer to leverage common functionality and reduce the application's file size. This approach is advantageous when a number of different applications make use of the same commonly used routines. The libraries that an application uses, but are not included with the distribution of the application, need to be present in the application's executing environment to execute the application as intended It is common practice to provide a wide variety of libraries and/or individual helper routines in an operating environment in order to support a wide variety of applications. Together these supporting elements comprise a general runtime environment that provides software services for processes or programs while a computer is running. The general runtime environment may further include an operating system, an associated kernel, and software that runs beneath the operating system, such as hardware and/or device drivers.

A general runtime environment may include many components that are not required by those applications that are actually executed. This may be a disadvantage in circumstances that include limits on available memory or other resources consumed by the unused components, or when the extra components conflict with each other.

In some instances a general runtime environment is contained within a virtual machine environment. A virtual machine environment is an environment that appears from the point of view of a software application within the virtual machine environment to be an independent hardware device. However, more than one virtual machine environment may be placed on a single hardware device. Each virtual machine environment may have different characteristics. This allows the single hardware device to support multiple applications or multiple copies of the same application each within their own isolated virtual machine environment.

In the prior art, a virtual machine environment is typically characterized by a virtual machine specification and a configuration file that contains the contents of a virtual disk. For example, VMware, Inc. of Palo Alto, Calif. supplies virtual machine products that are defined in a Virtual Machine Disk Format (VMDK). These products may be used to run several virtual machine environments on a single hardware device. Typically, the VMDK includes a disk image of an application, support files, and an associated operating system. The VMDK is a portable image that can be placed in a virtual machine container. The configuration file includes the specification of the virtual machine container in which this disk image is placed. For example, the configuration file may include an amount of memory and I/O resources to be included in the container. The virtual machine container determines the virtual machine environment experienced by the disk image.

Generation of the VMDK is typically a multi-step process in which an operating system is first installed on a clean hard disk, support files such as drivers and libraries are installed, and then an application is installed on the hard disk, in a step-by-step process. A snapshot of the disk and machine state may be taken between each step, each snapshot resulting in a disk image and corresponding machine state. After installation of the application, the image of the disk is used as a VMDK and installed in one or more virtual machine container. Each VMDK includes a full operating system and set of support files, just as in a general runtime environment that is not disposed within a virtual machine. Virtual machine environments can therefore have many of the same disadvantages as general runtime environments.

SUMMARY

Various embodiments of the invention include systems and methods of generating an application specific runtime environment for execution of an application, and executing the application within this environment. An application specific runtime environment includes software functionality required for executing a specific application. For example, the application specific runtime environment may include an executable application, an operating system, libraries, hardware drivers, configuration files, data, and any other software functionality required to execute the application.

The application specific runtime environment is typically a subset of a general runtime environment. As such, the application specific runtime environment is a reduced environment that requires fewer resources than a general runtime environment. For example, an application specific runtime environment may require less memory during application execution and/or less storage.

In various embodiments, an application specific runtime environment for a particular application is defined by an application environment specification. As is further described herein, some embodiments of the invention include systems and methods of determining an application environment specification. An application environment specification is optionally used to create an application specific runtime environment on-demand in response to a request to execute the related application. An application environment specification is optionally specific to a certain set of hardware.

In some embodiments, an application environment specification is used to generate an application specific runtime environment within a virtual machine. This virtual machine may be configured specifically in response to the application environment specification. For example, the virtual machine may be allocated resources, such as memory and software, as specified by the application specific runtime environment. This allocation may occur in response to a request to run the associated application. In some embodiments, a single hardware device may be configured to support more than one virtual machine.

Various embodiments of the invention include systems and methods of installing an operating system by generating a representation of the operating system in a form that is readily executable and transferring the generated representation to a target platform. The operating system representation is optionally generated in response to a request for installation of the operating system and is typically configured for use on a target platform having a specific set of resources and/or configured in a predetermined operating system configuration. The operating system representation may include, for example, a disk image of the operating system in an installed form. The operating system representation is optionally configured to support one or more virtual machines within virtual machine containers.

Various embodiments of the invention include a system comprising a resource repository configured to store resources, the resources comprising a software library configured to be used by one or more executable applications, a parser configured to identify a first undefined symbol in an executable application, to identify a first member of the resources including a definition of the first undefined symbol, and to add an identify of the first member to an application environment specification, and an application environment specification storage configured to store the application environment specification.

Various embodiments of the invention include a method comprising identifying a first unresolved symbol in an executable application, identifying a first resource comprising a definition of the first unresolved symbol, adding a first identifier of the first resource to an application environment specification, the application environment specification comprising a specification of an application specific runtime environment configured for executing the executable application, determining if the first resource includes a second unresolved symbol, if the first resource includes a second unresolved symbol, identifying a second resource comprising a definition of the second unresolved symbol and adding a second identifier of the second resource to the application environment specification, and associating the executable application with the application environment specification.

Various embodiments of the invention include a computer readable media having stored thereupon an application environment specification configured for provisioning of an application specific runtime environment and comprising one or more identifiers of resources required for execution of an executable application, a first of the resources including a definition of an undefined symbol within the executable application and a second of the resources including a definition of an undefined symbol within the first of the resources.

Various embodiments of the invention include a system comprising an external interface configured for a user to request execution of an executable application, a repository configured to store the executable application, resources and an application environment specification, the application environment specification including identification of those members of the resources on which execution of the executable application is dependent, a processing node configured for execution of the executable application in an application specific runtime environment, and a provisioning server configured to use the application environment specification to locate members of the resources and to uses these members to provision the application specific runtime environment.

Various embodiments of the invention include a method comprising receiving a request for execution of a first executable application, identifying an application environment specification associated with the first executable application, the application environment specification including the identity of resources on which the first executable application is dependent, locating the resources on which the first executable application is dependent, in a repository including resources on which a plurality of executable applications are dependent, provisioning an application specific runtime environment on a processing node, the application specific runtime environment including the resources on which the first executable application is dependent, and executing the first executable application on the processing node in response to the request.

Various embodiments of the invention include a computer readable media having stored thereupon an application specific runtime environment comprising a first executable application, a plurality of resources on which the first executable application depends, the plurality of resources identified using an application environment specification generated by parsing the executable application and at least one of the plurality of resources prior to executing the first executable application.

Various embodiments of the invention include a system comprising a processing node configured to support execution of an operating system on a target platform, a repository configured to store resources and a configuration file configured for execution of the operating system on the target platform, and a provisioning server configured for generating a representation of the operating system based on the resources and for transferring the representation and the configuration file to the processing node over a computing network.

Various embodiments of the invention include method comprising creating a representation of an operating system in an executable form, in response to a request for installation of the operating system on a target platform, creating a configuration file configured for use of the operating system within a specific predetermined set of resources of the target platform, adding the configuration file to the representation of the operating system, compressing the representation of the operating system, and transferring the compressed representation of the operating system to the target platform.

Various embodiments of the invention include a method comprising preparing a target platform for installation of an operating system, requesting a representation of the operating system in an executable form, the representation being compressed, receiving the representation of the operating system, receiving a configuration file configured for execution of the operating system within the target platform, and decompressing the representation of the operating system into the target platform.

BRIEF DESCRIPTION OF THE DRAWINGS

FIG. 1 is a block diagram illustrating a general runtime environment of the prior art.

FIG. 2 is a block diagram illustrating an application specific runtime environment, according to various embodiments of the invention.

DETAILED DESCRIPTION

Figure 3:
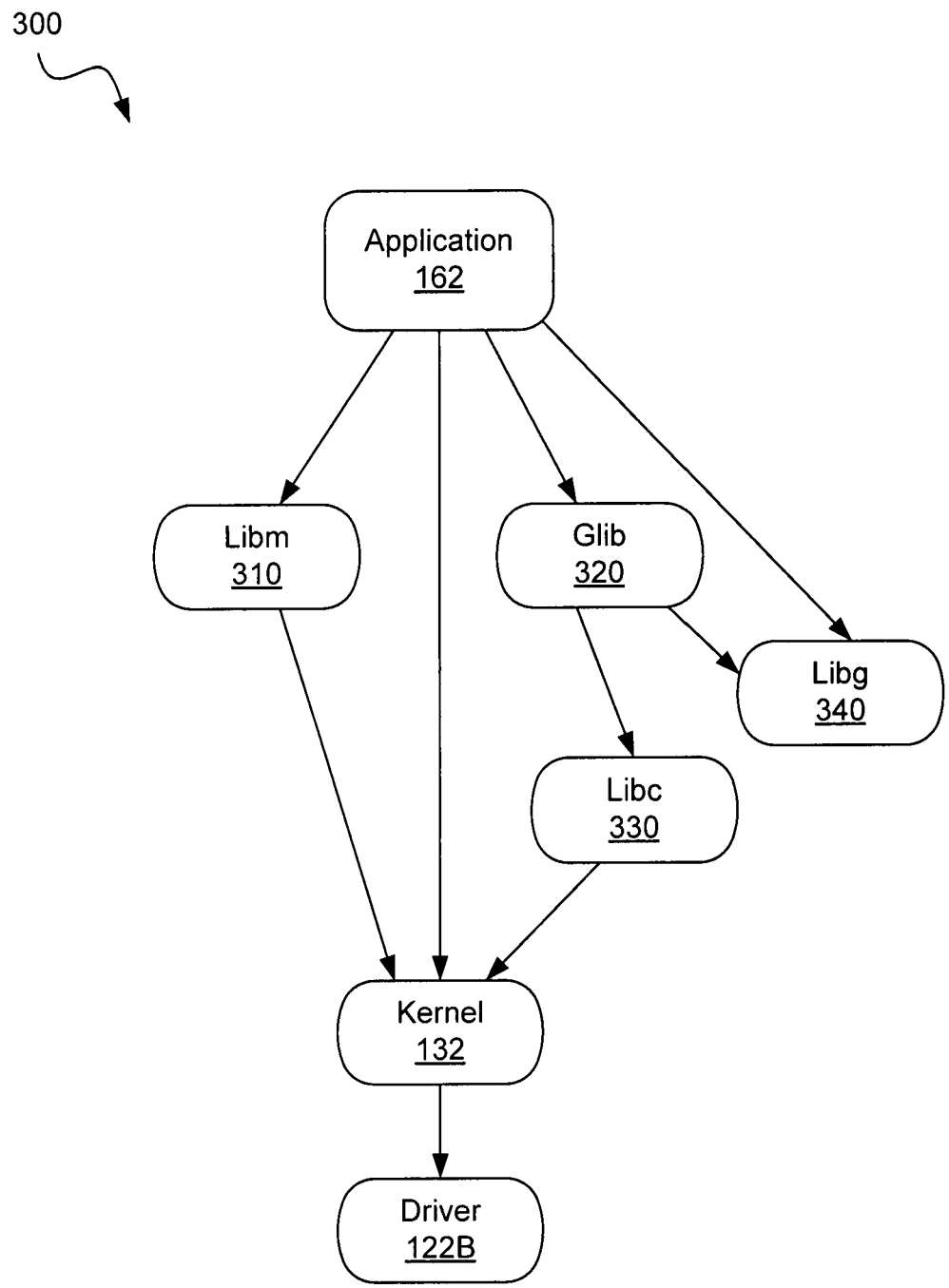
FIG. 3 includes a file dependency tree illustrating exemplary file dependencies, according to various embodiments of the invention.

Various embodiments of the invention include an application environment specification associated with a specific executable application and optionally associated with a specific hardware environment. The application environment specification is developed by examining the executable application and identifying the resources required for execution of that executable application. These resources may include for example, symbol definitions, operating system elements, drivers, and/or memory. Identified resources are optionally examined, themselves, to identify further required resources. Optionally, the resources specified in an application environment specification are a subset of those resources that would be found in a general runtime environment. The executable application can, therefore, be executed using a reduced environment relative to the prior art.

Optionally, the application environment specification is developed and stored for later use. For example, the application environment specification can be developed prior to receiving a request for execution of the associated application. Alternatively, the application environment specification may be developed in response to receiving a first request for execution of the associated application, and then stored for use in response to further requests.

When a request to run an executable application is received, the associated application environment specification is used to dynamically create (e.g., provision) the required application specific runtime environment. This application specific runtime environment is typically created in real-time. Provisioning of the application specific runtime environment optionally includes transferring resources from a storage location to a separate device where the application will be executed. The separate device may be a separate computing device, a separate server, a virtual machine, and/or the like. The executable application can then be executed in the application specific runtime environment. In some embodiments, a virtual machine is created in response to the request to run the executable application and this virtual machine is automatically provisioned using an associated application environment specification.

FIG. 1 is a block diagram illustrating a General Runtime Environment 100 of the prior art. The General Runtime Environment 100 includes an Application Layer 160 including a variety of separate Executable Applications 162A-162D, which may be executed within the General Runtime Environment 100. The General Runtime Environment 100 also includes a Library Layer 140, a Kernel Layer 130, a Driver Layer 120, and a Hardware Layer 110. These layers include, respectively, various Libraries 142A-142I, a Kernel 132, Drivers 122A-122E, and Hardware 115 configured for executing computing instructions included in the other layers. In some embodiments, one of Executable Applications 162A-162D is an operating system. Library Layer 140 optionally includes virtual hardware, e.g., software configured to emulate hardware.

Hardware 115 includes, for example, integrated circuits, network devices, input and output devices, storage devices, display devices, memory, processor(s), and/or the like.

The Driver Layer 120 includes Drivers 122A-122E configured to provide the lowest level of software control over Hardware 115 as required by Executable Applications 162A-162D. For example, the Drivers 122A-122E may include drivers for audio devices, disk drives, video cards, processors, network interface cards, mice, universal serial bus controllers or any potential hardware that may be used by any of the applications in the Application Layer 160. Device Drivers 122A-122E may include drivers configured for controlling additional hardware other than the Hardware 115 included in Hardware Layer 110. Further, device Drivers 122A-122E may be configured to perform additional actions other than those that may be required by applications 162A-162D. For example, some of device Drivers 122 may be received as part of an operating system and be included so that the operating system supports a wide variety of Hardware 115. Likewise, device Drivers 122 may be configured to perform tasks as may be required by a wide variety of applications.

The Kernel Layer 130 comprises the Kernel 132, which is the central logic of an operating system. For example, the Kernel 132 may be involved in management of memory and execution threads. The Kernel 132 coordinates access to Hardware 115 through device Drivers 122A-122E in order to accomplish tasks of required by the Executable Applications 162A-162D. The Kernel 132 may be accessed directly by the Executable Applications 162A-162D or by Libraries 142A-142I including in the Library Layer 140.

The Library Layer 140 includes Libraries 142A-142I, which may be provided as part of an operating system or provided separately to support specific members of Executable Applications 162A-162D. Each of Libraries 142A-142I can include sub-components, such as sub-libraries or individual modules. For example, Components 152, 154 and 156 may be included within Libraries 142A, 142E and 142H respectively. Libraries 142A-142I are configured to access Kernel 132 and support operations of Executable Applications 162A-162D. This access and support can be either direct or indirect. For example, library 142A may access Kernel 132 directly or via Libraries 142E and 142H.

These Executable Applications 162A-162D are differentiated from source code and object files in that they are executable directly from a command line. Executable Applications 162A-162D are ready to be executed without further compiling and typically include file names ending in .exe, .com, .bat, .js, .php., .scrpt., .as, or the like. For example, the executable application may include a database, accounting, presentation, CAD, imaging, multimedia, scientific, mathematical, web-based, communication, vertical market-based, or other software application.

During normal execution, Executable Application 162B makes calls to the Components 152 within library 142A. Components 152, in turn, makes calls to Components 154, and Components 154 makes calls to Components 156. Further, Components 156 makes calls to Kernel 132, Kernel 132 makes calls to Drivers 122A-122E, and Drivers 122A-122E control Hardware 115 to complete the task requested by Executable Application 162B. Executable Application 162B may also make calls directly to Kernel 132, Drivers 122A-122E, Components 142H, and/or the like. Executable Application 162B may also make calls to Library 142C, which returns resulting information to Executable Application 162B.

FIG. 2 is a block diagram illustrating an Application Specific Runtime Environment 200 configured for execution of Executable Application 162B, according to various embodiments of the invention. As illustrated, much of the resources included in the General Runtime Environment 100 are not included in the Application Specific Runtime Environment 200. Specifically, to the extent practical, in some embodiments only those resources required for the execution of Executable Application 162B are included in Application Specific Runtime Environment 200.

Typically, the Application Specific Runtime Environment 200 is generated on-demand according to an application environment specification associated with Executable Application 162B, and optionally associated with Hardware 115. For example, as illustrated in FIG. 1, Executable Application 162B does not require library 142C. Library 142C is, therefore, not specified by the application environment specification for inclusion in Application Specific Runtime Environment 200. Likewise, because library 142B is required by Executable Application 162B, library 142B is specified as being included in Application Specific Runtime Environment 200 by the associated application environment specification.

In some cases, a specific library component can be separated from the remainder of a library for inclusion in Application Specific Runtime Environment 200. For example, FIG. 2 shows Components 152 separated from the remainder of Library 142A. In some cases, a specific library component cannot be separated from the remainder of a library. For example, Components 154 cannot be separated from Library 142E. As such, all of library 142E is included in Application Specific Runtime Environment 200.

The Application Level 160 illustrated in FIG. 2 contains fewer applications than the Application Level 160 illustrated in FIG. 1. The Application Layer 160 of Application Specific Runtime Environment 200 contains the Executable Application 162B, and may contain one or more helper applications that a user may want to use in combination with Executable Application 162B. A helper application is external to a host application for which functionality is added to the host application. For example, Windows Media Player™ is a helper application for playing streaming content in a browser application.

The Library Layer 140 of Application Specific Runtime Environment 200 typically comprises fewer components than the Library Layer 140 of General Runtime Environment 100. In Application Specific Runtime Environment 200, the library environment contains components required by Executable Application 162B during execution, such as the Components 152, 154, and 156. Some components may be extracted from their respected libraries while other components can only be added to Application Specific Runtime Environment 200 as part of a full library. For example, as illustrated in FIG. 2, Components 152 has been extracted from library 142A while Components 154 is added along with other, unused parts, of library 142E.

The same Kernel 132 is optionally included in each of the Application Specific Runtime Environment 200 and the General Runtime Environment 100. The same Kernel 132 is used because kernels are typically difficult to divide into separate parts. In addition, the use of the same Kernel 132 results in the same deterministic behavior in each of General Runtime Environment 100 and the Application Specific Runtime Environment 200.

The Driver Layer 120 of Application Specific Runtime Environment 200 contains device drivers, such as Driver 122B, used by Executable Application 162B during execution. The Driver Layer 120 included in Application Specific Runtime Environment 200 typically has fewer drivers than the Driver Layer 120 of application runtime environment 100. The Hardware 115 may be the same for both the runtime environment 100 and the Application Specific Runtime Environment 200.

The components and libraries included in Application Specific Runtime Environment 200 are a function of dependencies between these various elements. These dependencies arise when Executable Application 162B makes use of a symbol or other data that is defined in one of the other components. For example, Executable Application 162B may be dependent on Component 152 and library 142B for proper execution.

Symbols may include identifiers of functions, procedures, variables, types, or the like, that are used by an application. For example, a symbol called "print" may be a handle to a function used for printing. A symbol may be used in an executable application, a library, a kernel or a driver, and may be defined in the same file that it is used or in another file. If the definition of a symbol is in a file other than the file in which it is used, then the definition must be available in the other file at the time of execution. As such, any references to "print" must be resolvable using the definition of "print." This definition typically includes computing instructions to be performed by the function. At runtime, if the definition of "print" is not within the file in which the symbol is used, then the definition is looked for by the operating system or compiler. For example, a dynamic runtime linker may be used to find the definition of "print" when it is required by the application.

FIG. 3 includes File Dependency Tree 300 illustrating exemplary file dependencies for Executable Application 162B, according to various embodiments of the invention. For illustrative purposes, these dependencies are different from those illustrated in FIG. 2. The block diagram 300 comprises library Libm 310, library Glib 320, library Libc 330 and library Libg 340, which are embodiments of Libraries 142A-142I. The Executable Application 162B is dependent directly on the library Libm 310, the library Glib 320, and the library Libg 340. These libraries are, in turn, dependent on Libc 330, Kernel 132 and Driver 122A-122E.

Given the dependencies illustrated in FIG. 3, an application environment specification for the Executable Application 162B will include data identifying library Libm 310, library Glib 320, library Libc 330, library Libg 340, and Kernel 132. If the application environment specification is specific to a particular hardware environment, then the application environment specification may also include data identifying Driver 122B. As is described further herein, the application environment specification optionally also includes meta information such as the number of bytes required to store the required resources and the amount of working memory required to execute Executable Application 162B. This meta information may include a large variety of information such as an authorized user identifier, licensing information, executable applications that can be jointly provisioned, and/or the like. The resulting embodiment of Application Specific Runtime Environment 200 or 300 includes the Executable Application 162B, library Libm 310, library Glib 320, library Libc 330, library Libg 340, Kernel 132 and Driver 122B.

Figure 4:
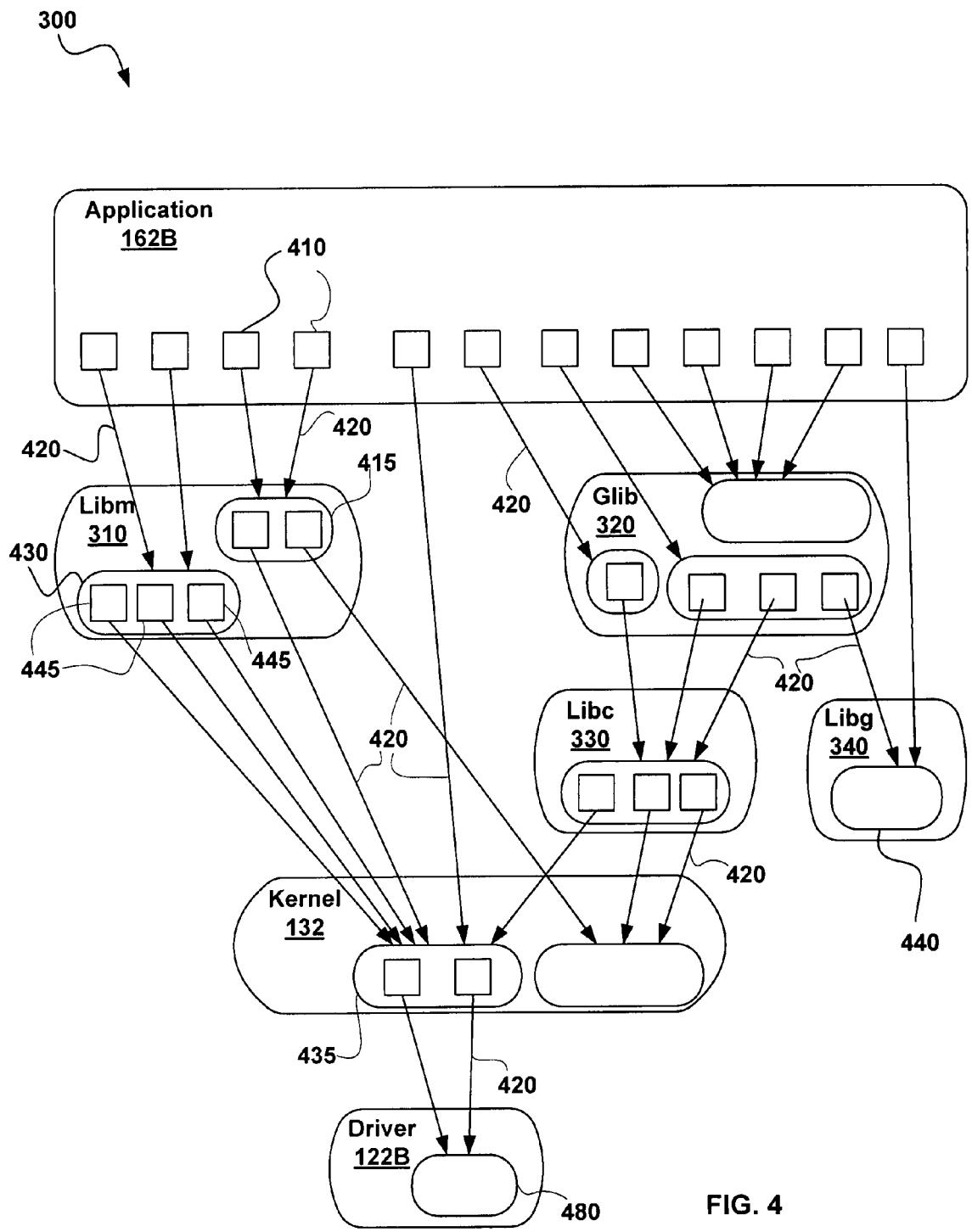
FIG. 4 illustrates further details of the file dependency tree of FIG. 3, according to various embodiments of the invention.

FIG. 4 illustrates further details of the File Dependency Tree 300 illustrated in FIG. 3, according to various embodiments of the invention. As illustrated in FIG. 4, the dependency tree 300 may comprise symbols or other dependencies, indicated by squares, which are defined outside of the particular files in which they are used. For example, Symbol 410 is defined by, at least in part, by a Definition 415 within Libm 310. Symbol 410 may be used more than one time within Executable Application 162B. For example, Symbol 410 may be a handle to a function used twice in executable application, and definition 415 may include the logic, e.g. computing instructions, of the function. In FIG. 4, Arrows 420, some of which are labeled, are used to illustrate dependencies.

A symbol definition may include further symbols that are defined in other definitions. For example, a Definition 430 within Libm 310 includes three Symbols 445 defined in a Definition 435 of Kernel 132. Likewise, Definition 435 includes symbols 420 defined by a Definition 480 within Driver 122B.

An application runtime specification is developed by identifying these dependencies and a minimal set of components required to execute an application. As is discussed further herein, the identification of dependencies is accomplished using a top down approach starting with Executable Application 162B. The application runtime specification is optionally developed without executing the executable application.

Figure 5:
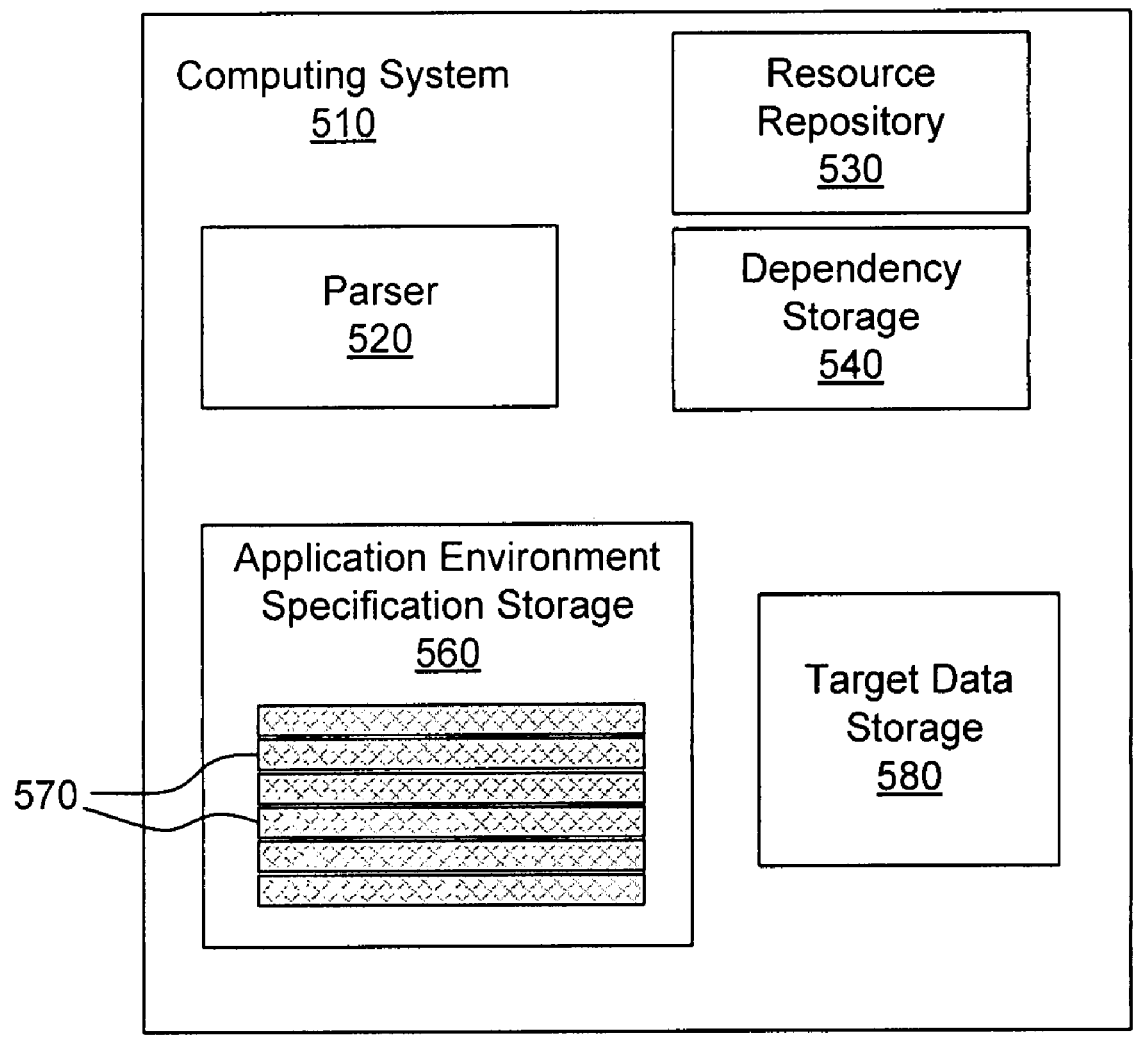
FIG. 5 is a block diagram of a computing system configured for generation of an application runtime specification, according to various embodiments of the invention.

FIG. 5 is a block diagram of a Computing System 510 configured for generation of an application runtime specification, according to various embodiments of the invention. Computing System 510 is configured to receive one or more of executable application, e.g., Executable Application 162B, and a set of resources such as Libraries 142A-142I, Kernel 130, and Drivers 122B. As is discussed further herein, Computing System 510 uses these inputs to identify the set of resources required by the executable application and to include identification of the set as part of an application environment specification. The set of resources required by the executable application is typically a subset of the total resources available. Computing System 510 comprises a Parser 520, a Resource Repository 530, a Dependency Storage 540, an optional Target Data Storage 580, and an Application Environment Specification Storage 560.

Parser 520 is configured to parse the executable application. This parsing includes, for example, identifying grammatical structures, variables, data, symbols, and symbol definitions within the executable application. Parser 520 is configured to receive the executable application as compiled computing instructions and/or as a script. In some embodiments, Parser 520 is configured to generate a tree data structure that reflects the grammatical structure of the executable application. For example, Parser 520 may operate in two stages, a first stage including identifying meaningful elements in the input, and a second stage including building a parse tree from those elements.

Parser 520 is configured to identify those symbols within the executable application that are defined by a definition within the executable application and those symbols that are not defined by a definition within the executable application. For those symbols that are not defined by a definition within the executable application, Parser 520 is configured to search other resources for a definition. These resources may include Libraries 142A-142I, Kernel 132 and/or Drivers 122A-122E.

The Libraries 142A-142I, Kernel 132 and/or Drivers 122A-122E may be stored along with other resources in a Resource Repository 530. Resource Repository 530 includes storage such as a hard drive or an optical drive. In some embodiments, Resource Repository 530 is distributed among several storage, devices.

In some embodiments, Resource Repository 530 includes an image, or part thereof, of an application specific runtime environment. For example, if a set of resources are commonly used in combination, then these resources may be stored as a unit. In some embodiments, Resource Repository 530 includes an image of an entire application specific runtime environment. In these embodiments, the application environment specification may merely include a reference to this image. Provisioning of the application specific runtime environment may then include copying the image or components of the image of the application specific runtime environment to a location for execution of the executable application.

As is further described elsewhere herein, when a resource such as Library 142B is identified as including a definition of a symbol within the executable application, and a definition is not found in the executable application, then the executable application is considered dependent on the resource. Optionally, data representative of this dependence is stored in a Dependency Storage 540. The data may include an identifier of the resource or of an extractable component of the resource. After the executable application has been processed by Parser 520, Dependency Storage 540 may include identification of several resources on which the executable application is dependent.

Some of the resources included in Resource Repository 530 and identified in Dependency Storage 540 may themselves include undefined symbols. These symbols are identified by processing the resource using Parser 520 in a manner similar to the processing that is applied to the executable application. The identification of dependencies may be performed as an iterative process. As such, a hierarchy of dependencies can be identified.

A list of resources required for the execution of the executable application is stored as an application environment specification in an Application Environment Specification Storage 560. Application Environment Specification Storage 560 includes one or more hard drive, optical drive, or the like. The application environment specification may include Records 570 comprising data identifying each of the resources indicated as being required for the execution of the executable application. This data may be retrieved from Dependency Storage 540 after the processing of the executable application and required resources using Parser 520, and can also include additional configuration files, etc. In alternative embodiments, Dependency Storage 540 and Application Environment Specification Storage 560 are combined into a single storage.

In some embodiments, the application environment specification stored in Application Environment Specification Storage 560 is specific to a predetermined hardware target. Information about this hardware target is optionally stored in a Target Data Storage 580. For example, if the target includes a specific display device and a specific processor type, this information is stored in Target Data Storage 580 and used by Computing System 510 for the selection of appropriate members of Drivers 122A-122E.

In some embodiment's, Parser 520 is configured to generate a multiple application environment specification. A multiple application environment specification is an application environment specification configured for provisioning the resources required by two or more executable applications in combination. For example, if a user wishes to execute a database and an accounting application at the same time, it may be desirable to provision both of these executable applications in the same application specific runtime environment.

A multiple application environment specification can be generated by merging two previously existing application specific environment specifications, e.g., combining their lists of required resources and removing duplicates. Alternatively, a multiple application environment specification can be generated by processing both executable applications using Parser 520 to generate a multiple application environment directly.

Figure 6:
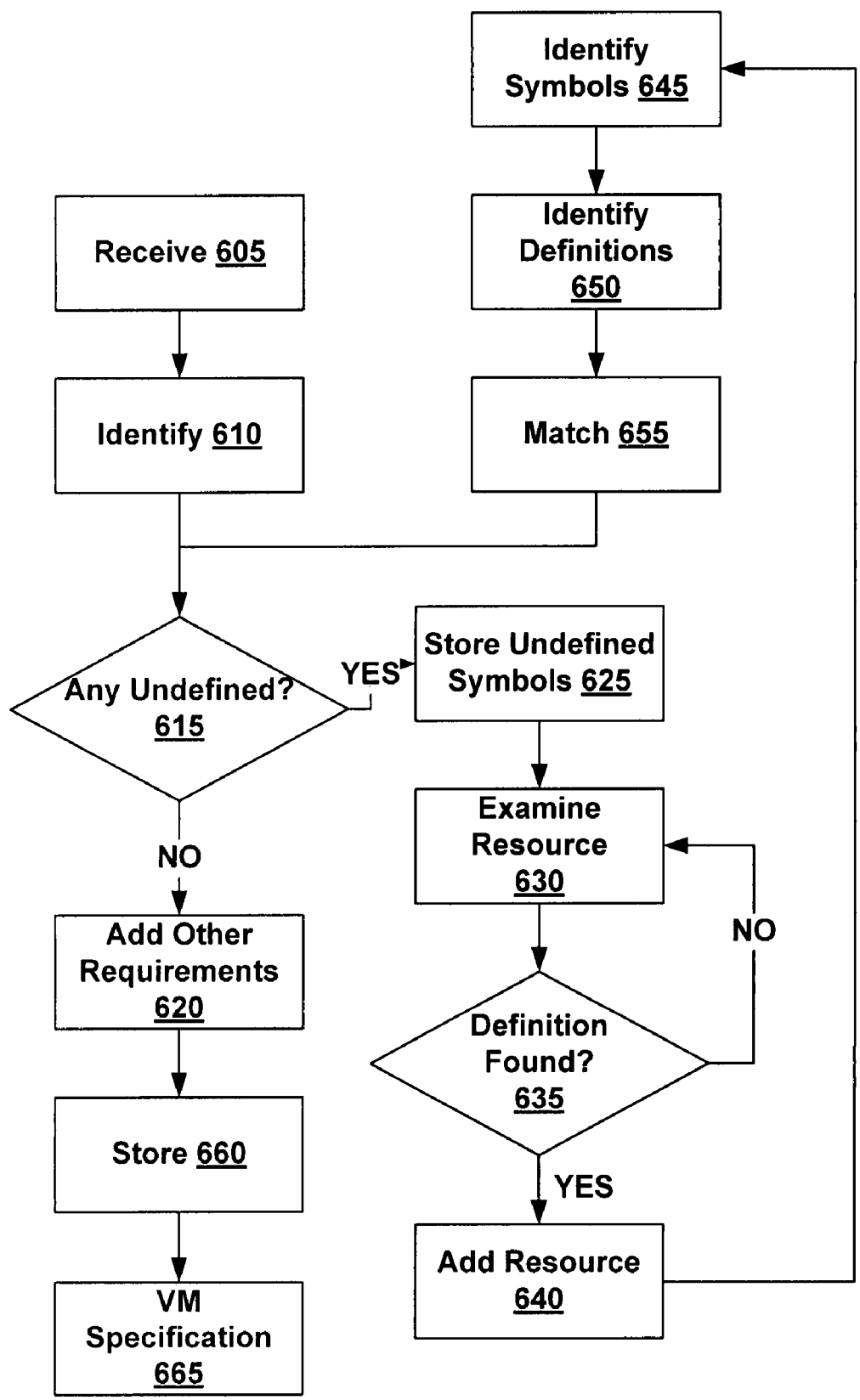
FIG. 6 is a flowchart illustrating a method of generating an application environment specification, according to various embodiments of the invention.

FIG. 6 is a flowchart illustrating a method of generating an application environment specification, according to various embodiments of the invention. This method may be applied to executable applications that include compiled computer code or a script. The method includes iterative steps in which a hierarchy of dependent files are processed.

In a Receive Step 605, Computing System 510 receives an executable application, e.g., Executable Application 162B, for which an application environment specification is to be generated. The received executable application can include compiled computer code, a script, and/or any other executable file. Receive Step 605 may also include receiving target data that characterized a specific target hardware environment to be associated with the application environment specification.

In an Identify Step 610, symbols and symbol definitions are identified within the received executable application using Parser 520. The identification is optionally performed without executing the executable application. If the executable application includes a symbol import table that lists symbols whose definitions need to be imported, then this table may be used to identify some or all of the symbols required by the executable application. The symbol import table may be generated by a compiler. The executable application is optionally fully parsed in order to identify undefined symbols. As discussed elsewhere herein, this parsing can include identification of symbols, definitions, data and other parts of the executable application. Unidentified symbols are stored in Dependency Storage 540.

If the executable application includes a script, then Identify Step 610 may include converting the script into a series of tokens and interpreting these tokens. Processing of a script is described in further detail elsewhere herein.

In an Any Undefined Step 615 it is determined if any undefined symbols were identified in Identify Symbols Step 610. If no undefined symbols were found, then the method proceeds to an optional Add Other Requirements Step 620. If undefined symbols were found, then the method proceeds to an optional Store Undefined Symbols Step 625.

In Store Undefined Symbols Step 625, any undefined symbols are stored in Dependency Storage 540. These symbols are optionally stored in a tree data structure.

In an Examine Resource Step 630 one or more of the resources within Resource Repository 530 is examined in order to find definitions for the undefined symbols stored in Dependency Storage 540. This examination may be performed one resource at a time or several resources at a time. The examined resources may include Libraries 142A-142I, Kernel 132, and/or Drivers 122A-122E. Sometimes, these resources will include export tables having a list of symbols defined in the resource and pointers to those definitions. When this is the case, examination of the resource typically includes examination of these tables.

In a Definition Found Step 635, it is determined whether a definition for an undefined resource was found. If not, then Examine Resource Step 630 is optionally repeated until a definition is found. If no definition is found for an undefined symbol after examining all of Resource Repository 530, then Computing System 510 may be configured to seek additional resources.

If a definition is found in Examine Resource Step 630 then an identifier of the resource is added to Dependency Storage 540 in an Add Resource Step 640. For example, the identifier may include a file name, version, distribution, license information, user information, directory, and/or the like. In some embodiments, a definition of a symbol can be extractable from a resource. If this is possible, then the identifier stored in Add Resource Step 640 may include both an identification of the resource and an identification of the extractable component within the resource.

In an Identify Symbols Step 645, the resource whose identifier is added to Dependency Storage 540 in Add Resource Step 640 is processed to identify any undefined symbols within the resource. Identify Symbols Step 645 is similar to Identify. Symbols Step 610 except that the data parsed is a resource rather than the executable application.

In an Identify Definitions Step 650, the resource whose identifier was added to Dependency Storage 540 in Add Resource 640 is examined to identify any additional definitions within the resource. For example, the resource may include several definitions, one of which was identified as being for an undefined symbol in Examiner Resource Step 630.

In a Match Step 655, the other definitions found in Examine Resource Step 630 and identified in Identify Definitions Step 650 are compared with the undefined symbols stored in Dependency Storage 540. These definitions may be for one or more of the undefined symbols. If a match is found between any of the undefined symbols and the definitions then the state of the symbol is changed from undefined to defined, and an identification of the resource and/or component thereof is added to the Dependency Storage in association with the match symbol. Any Undefined Step 615 is then repeated as part of a next iteration. In this iteration the undefined symbols stored in Store Undefined Symbols may include symbols used by a resource found in a previous iteration.

If no other symbols are undefined, then the method proceeds to an optional Add Other Requirements Step 620. In Add Other Requirements Step 620, additional information may be added to Dependency Storage 540. This additional information may include memory requirements, known data, and/or configuration information.

In a Store Step 660, the dependency information developed using the method of FIG. 6 and stored in Dependency Storage 540 is stored as an application environment specification in Application Environment Specification Storage 560. Store Step 660 may further include storage of target information from Target Data Storage 580 in Application Environment Specification Storage 560. The stored application environment may be kept for later use and/or used immediately. Store Step 660 optionally includes combining more than one application environment specification to generate a multi-application environment specification.

In an optional VM Specification Step 665, information gathered during Steps 605-655 is used to generate a virtual machine specification. This information may include for example, an amount of memory required to store the resources added in Add Resource Step 640. This amount of memory may be used to determine an amount of memory to allocate for a virtual machine as specified in the virtual machine specification.

Each stored application environment specification is associated with an executable application, such as Executable Application 162B, and optionally a specific hardware target. In some embodiments, the executable application is associated with the application environment specification by using a name and version of the executable application as an index within the Application Environment Specification Storage 560. In some embodiments, the executable application and application environment specification are associated using a table.

Figure 7:
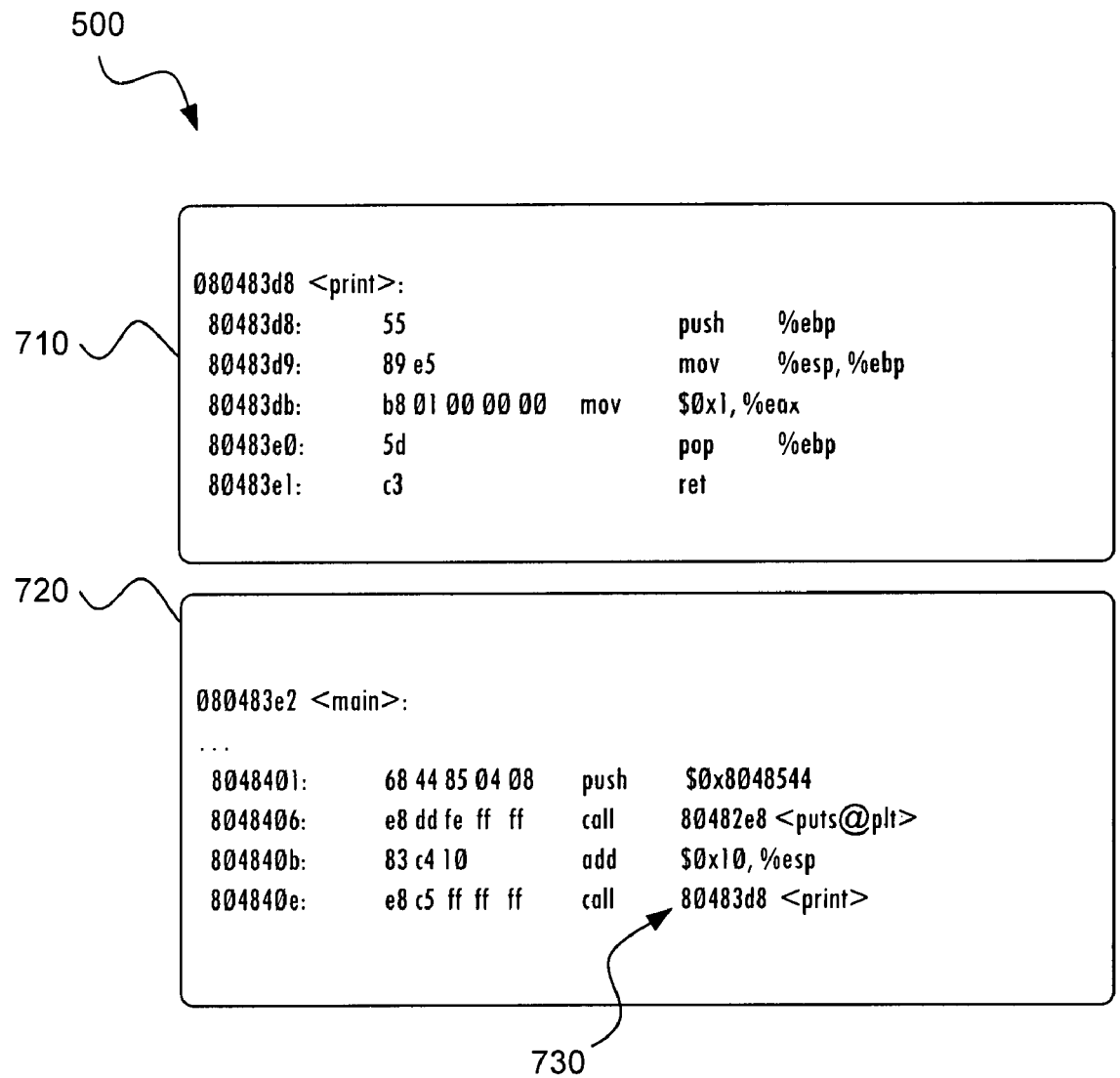
FIG. 7 includes an illustration of compiled code with annotations, according to various embodiments of the invention.

FIG. 7 includes an illustration of compiled code with annotations, according to various embodiments of the invention. Two code Segments 710 and 720 are shown. Code segment 710 may be included in Library 142B while code Segment 720 is included in Executable Application 162B. In each code segment, a hexadecimal representation of executable instructions is shown to the left and annotations of the instructions are shown to the right. For example, the instruction at hexadecimal address 804840e will be interpreted by a processor as the instruction "call." The instruction "call" is configured to use an operand that is a label to a function. This label may be an absolute reference to a memory location or may be a symbol. Specifically, in the example shown the instruction "call" will operate using the operand 80485d8, which is an address of a function "print." When an unresolved symbol is resolved, it can be replaced by an address or similar. Parser 520 is configured to differentiate between symbols that have been replaced by address (e.g., resolved symbols) and symbols that have yet to be replaced by addresses (e.g., unresolved symbols).

Figure 8:
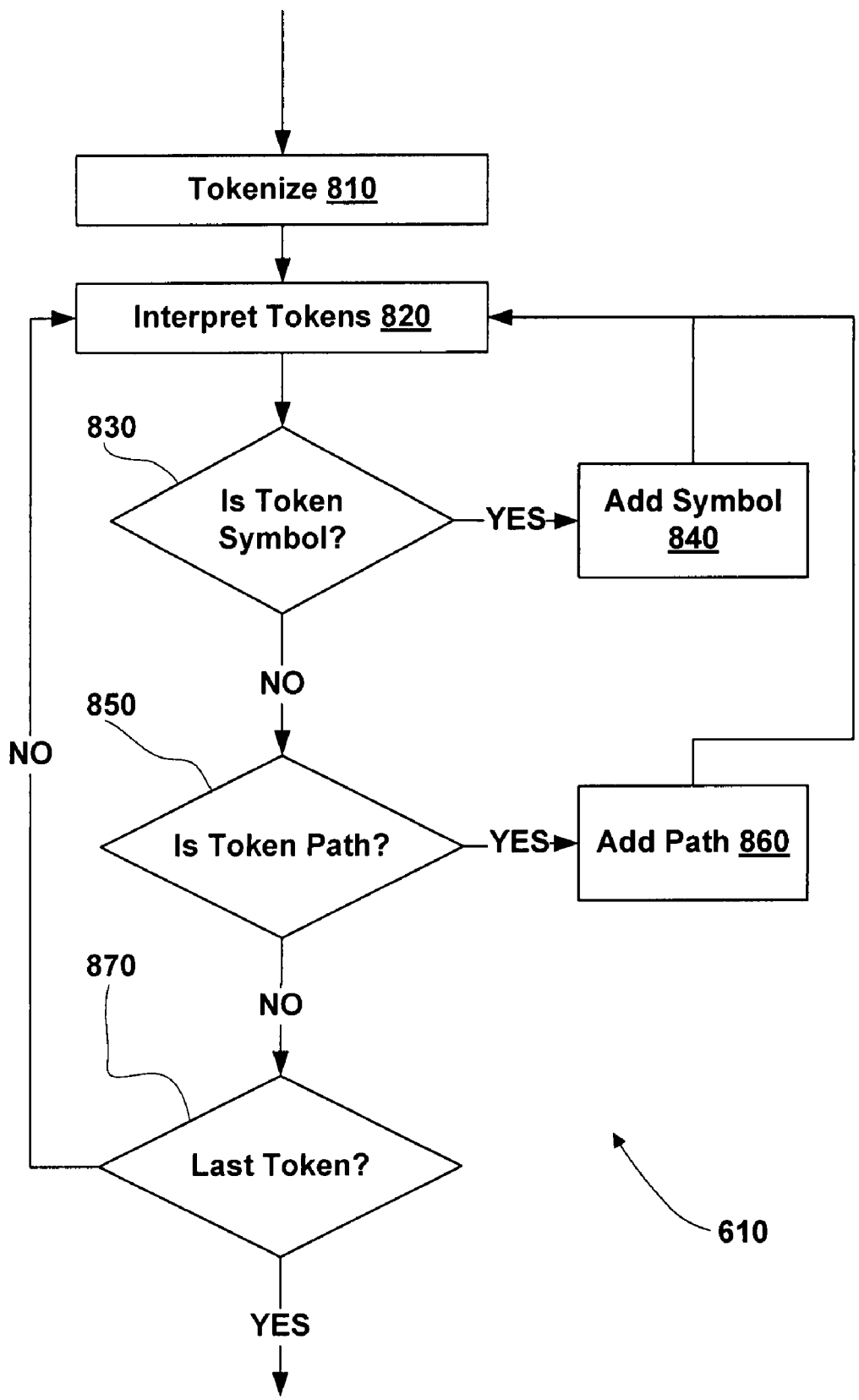
FIG. 8 is a flowchart illustrating sub-steps of a step of FIG. 6, according to various embodiments.

FIG. 8 is a flowchart illustrating sub-steps of the Identify Symbols Step 610 of FIG. 6, according to various embodiments. These sub-steps may be used, for example, when the executable application includes a binary file, script, text, and/or similar grammatical structure. For example, this method may be used to identify text that includes file names and/or directory paths. These elements, like undefined symbols, create dependencies between an executable application and other resources. As such, they are handled in various embodiments in manners similar to undefined symbols.

In a Step 810, the executable application is tokenized. Tokenization includes demarcating and optionally classifying sections of a string of input characters. For example, the beginning and ending of an operator or a symbol may be demarcated. The tokenization process allows the Parser 520 to identify individual symbols and, thus, interpret a binary file or script correctly.

In Interpret Tokens Step 820, Parser 520 is used to examine the executable application one token at a time. For each token within the executable application, an Is Token Symbol Step 830 is used to determine if the token is a symbol. If the token is a symbol, then it is added to a list of symbols. The method then returns to Interpret Tokens Step 820.

If the token is not a symbol, then an Is Token Path Step 850 is used to determine if the token is a path and/or file name. The file name may be the name of a file including a script, an application, a library, or a device driver. The path may include an absolute file system path, e.g., c:\lib\mylib1, a relative file system path, e.g., \lib\mylib1, or a network address, e.g., www.fastscale.com\lib. If the file is a path then the path is added to a list of paths in an Add Path Step 860. The method then returns to Interpret Tokens Step 820.

Steps 820 thru 860 are repeated for each token until it is determined that the last token has been processed in a Last Token Step 870.

The methods illustrated by FIG. 6 typically do not require execution of Executable Application 162B. However, in some embodiments, an application environment specification is generated or modified while executing Executable Application 162B. In these embodiments, the generation of the application environment specification is dynamic. For example, a dependency may be found during execution rather than prior to execution. When found, this dependency is added to the application environment specification and the required resource is located and added to the application specific runtime environment in real-time.

Figure 9:
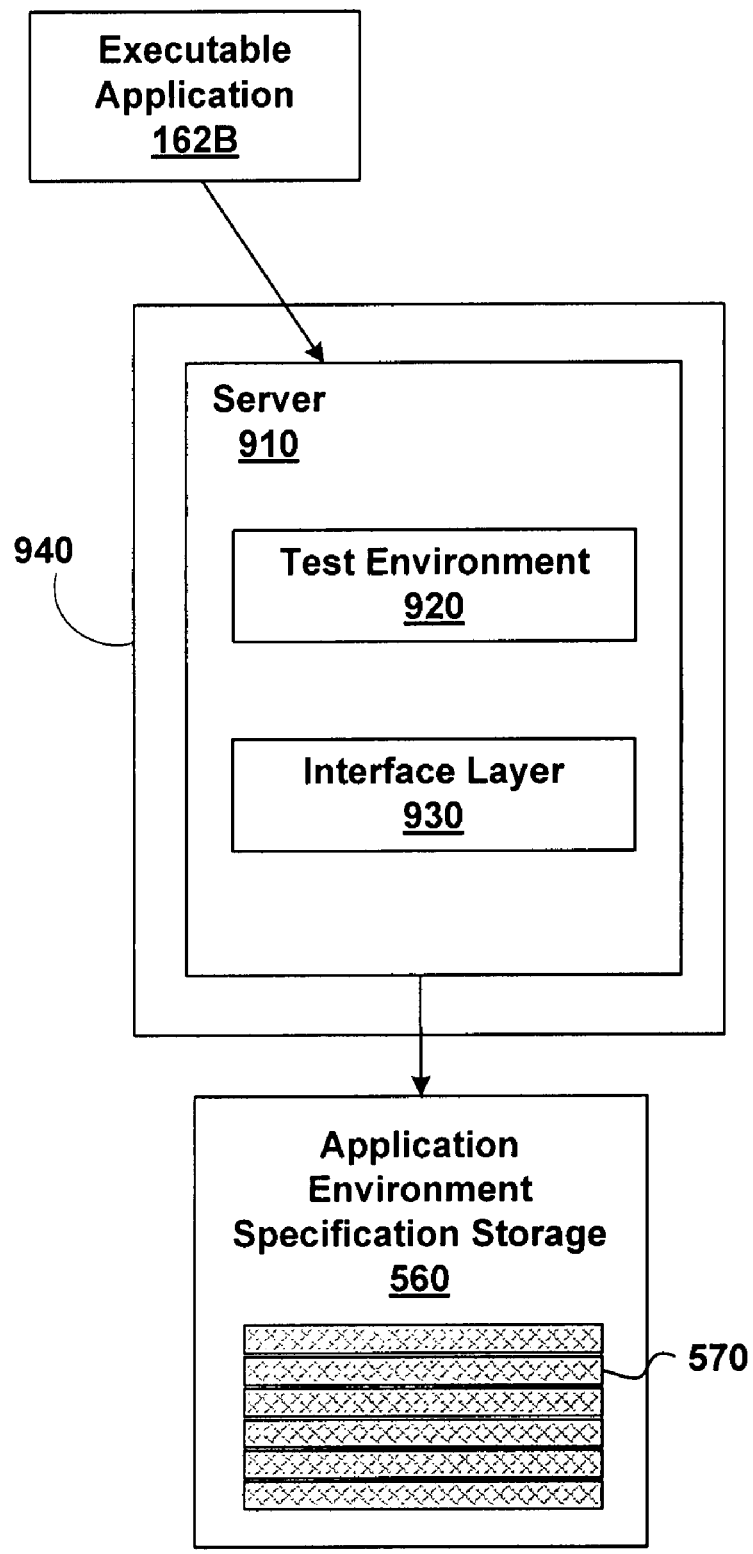
FIG. 9 is a block diagram illustrating details of an exemplary server configured for dynamically determining an application environment specification, according to various embodiments of the invention.

FIG. 9 is a block diagram illustrating details of an exemplary Server 910 configured for dynamically determining an application environment specification, according to various embodiments of the invention. The Server 910 may include a physical computing device or a virtual machine, and comprises a Test Environment 920 and an Interface Layer 930.

The Test Environment 920 is either a general runtime environment or an application specific runtime environment. For example, the Test Environment 920 may comprise a general runtime environment including Red Hat® Enterprise® 3.0 with a full set of standard libraries installed. Alternatively, the Test Environment 920 may include an application specific runtime environment provisioned using an application environment specification previously generated using the methods of FIG. 6, or the like.

When the Test Environment 920 is a general runtime environment, the application environment specification is generated by monitoring which resources within the general runtime environment are actually used in the execution of Executable Application 162B. When a resource is used, it is added to the application environment specification. Resources within the general runtime environment that are not used are not added to the application environment specification. After running Executable Application 162B for some time or completely, the application environment specification is saved in Application Environment Specification Storage 560.

When the Test Environment 920 is an application specific runtime environment, the execution of the Executable Application 162B is monitored and if a required resource is found not to be in the application specific runtime environment, then the application environment specification used to provision the application specific runtime environment is modified to include the required resource. Optionally, the required resource is located and added to the application specific runtime environment in real-time.

In various embodiments, several approaches are used to generate and modify an application specific runtime environment. For example, in some embodiments, an Executable Application 162B is first executed in a general runtime environment in order to generate a first version of an application environment specification. Executable Application 162B is then executed in an application specific runtime environment in order to modify the first version of the application environment specification. In other embodiments, a first version of an application environment specification is generated using the methods illustrated in FIG. 6, and this first version is then modified by executing Executable Application 162B within an application specific runtime environment.

The Interface Layer 930 is configured to monitor communications between the Executable Application 162B and the Test Environment 920. If the communication involves a use of resources, then these resources are identified as being required for the execution of the Executable Application 162B. Interface Layer 930 is optionally configured to monitor communications by monitoring activity of a file system within the Test Environment 920. For example, Interface Layer 930 may be configured to intercept requests to open a file. In some embodiments, Interface Layer 930 is configured to operate between the Executable Application 162B and an operating system of Test Environment 920.

Server 910 is optionally a virtual machine within a Virtual Machine Container 940. For example, Server 910 can include a disk image disposed within a virtual machine container defined by a virtual machine specification. This disk image is optionally associated with a specific disk drive type. For example, the disk image may be configured according to the IDE [Integrated Drive Electronics] or SCSI [Small Computer System Interface] standards. In some embodiments, the virtual machine container is supported by software available from VMware, Inc., (e.g., VMware® ESX server, VMware Workstation, VMware server, etc.). In some embodiments, the disk image is modified according to results of testing performed in the Test Environment 920. When this occurs, the disk image may be moved to a different instance of Virtual Machine Container 940. This instance of Virtual Machine Container 940 may have characteristics, e.g., an amount of memory, according to the results of testing. Application Environment Specification Storage 560 is optionally configured to store the virtual machine specification in association with the executable application and/or the application environment specification. In some embodiments, the virtual machine specification is included within the application environment specification.

Figure 10:
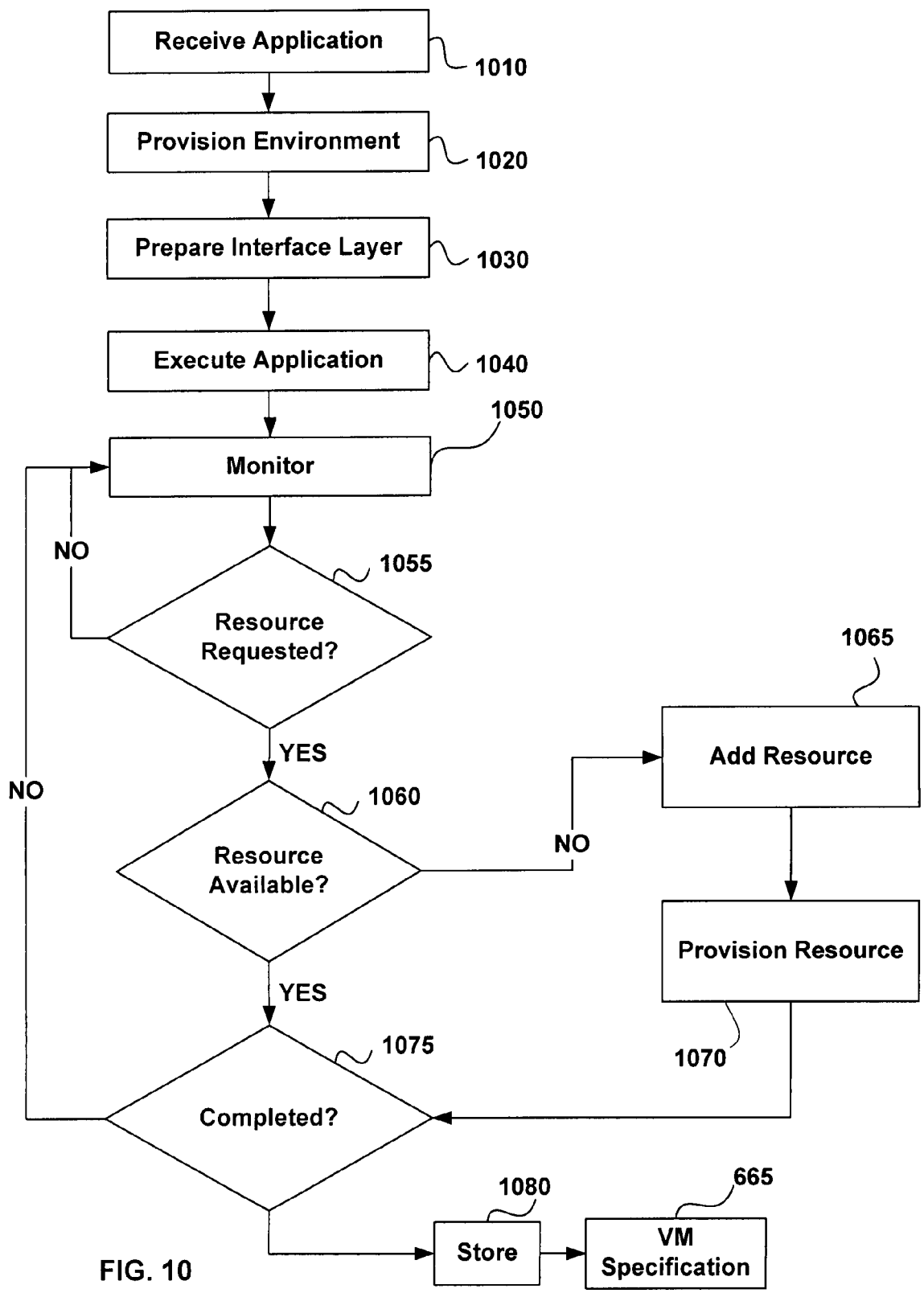
FIG. 10 is a flowchart of methods for dynamically modifying an application environment specification, according to various embodiments of the invention.

FIG. 10 is a flowchart of methods for dynamically modifying an application environment specification, according to various embodiments of the invention. In these methods, it is assumed that at least a version of an application environment specification already exists. This application environment specification is used to generate a Test Environment 920 in which Executable Application 162B is executed. Interface Layer 930 is used to monitor the execution and modify the application environment specification as needed.

Specifically, in a Receive Application Step 1010, the Executable Application 162B is received by Server 910. This receipt may be in response to an end user requesting use of Executable Application 162B or in response to an administrator requesting execution of Executable Application 162B for the purpose of generating/modifying an application environment specification. As is described elsewhere herein, the Executable Application 162B may be received from a storage location.

In a Provision Environment Step 1020, an application specific runtime environment, such as Application Specific Runtime Environment 200, is provided with the resources required to execute Executable Application 162B according to the application environment specification associated with the Executable Application 162B. As is further described elsewhere herein, these resources may be retrieved from Resource Repository 530. In some embodiments, Provision Environment Step 1020 includes establishing a virtual machine on which Executable Application 162B is to execute.

In a Prepare Interface Layer Step 1030, the Interface Layer 930 is added to the provisioned application specific runtime environment. This step may include, for example, adding software hooks to the Executable Application 162B such that Interface Layer 930 can monitor communications between Executable Application 162B and the operating system.

In Execute Application Step 1040, the Executable Application 162B is executed. This execution will optionally include communications between the Executable Application 162B and a user or administrator. For example, if the Executable Application 162B is a database or an accounting application, execution may involve communication of queries or data from the user or administrator to the Executable Application 162B. These communications may cause various components, which require various resources, within the Executable Application 162B to be executed.

In a Monitor Step 1050, the execution of Executable Application 162B is monitored using Interface Layer 930 in order to determine resources requested and/or used by Executable Application 162B.

In a Resource Requested Step 1055, it is determined whether a resource has been requested by Executable Application 162B. If a resource has not been requested, then the method continues with Monitor Step 1050.

If a resource has been requested, then in a Resource Available Step 1060, Interface Layer 930 is used to determine if the requested resource is included in the application environment specification associated with the Executable Application 162B. If the resource is included in the application environment specification, then it should have been made available as part of Provisional Environment Step 1020.

If the resource is not available, then in an Add Resource Step 1065 the resource is added to the application environment specification. The resource is typically then added to the application specific runtime environment in a Provision Resource Step 1070. Provision Resource Step 1070 may include, for example, copying the resource from Resource Repository 530 to the application specific runtime environment.

If, in Resource Available Step 1060 it is determined that the resource is available, then the method returns to a Completed Step 1075 in which it is determined whether or not the execution of the Executable Application 162B is completed. If the execution is not completed then the method returns to Monitor Step 1050. Steps 1050 through 1075 may be repeated until the execution of Executable Application 163B is completed.

If the execution is completed then the method proceeds to a Store Step 1080. In Store Step 1080, the modified application environment specification is stored, for example, in Application Environment Specification Storage 560. Store Step 1080 is optionally followed by VM Specification Step 665 which is described elsewhere herein.

Figure 11:
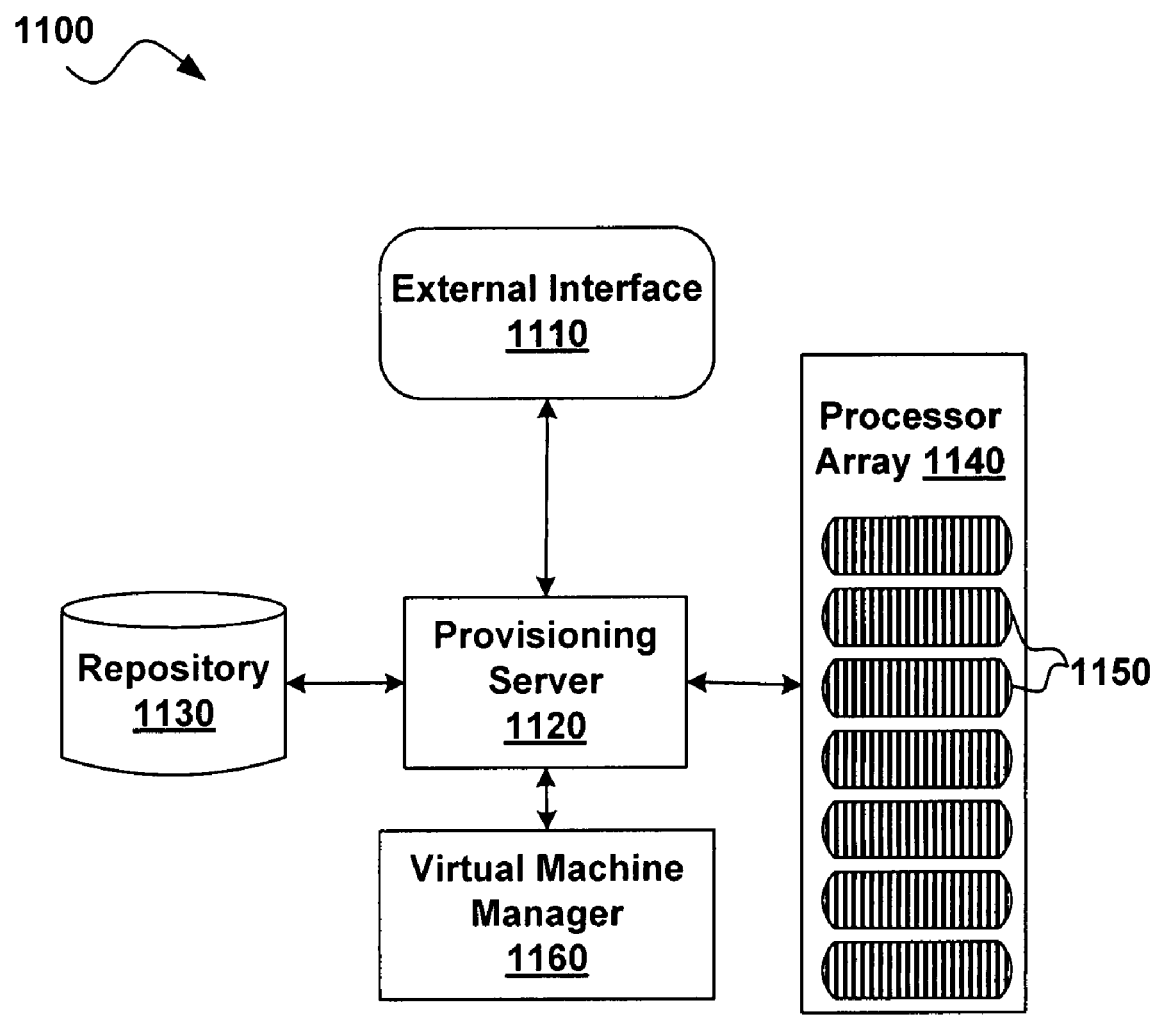
FIG. 11 illustrates an application provisioning system, according to various embodiments of the invention.

FIG. 11 illustrates an Application Provisioning System 1100, according to various embodiments of the invention. The Application Provisioning System 1100 is configured for supporting a plurality of Executable Applications 162A-162D each in a possibly different application specific runtime environment. Application Provisioning System 1100 may be used, for example, to provide executable applications to an enterprise or other group of users. When Application Provisioning System 1100 is used to provide multiple executable applications, the advantages of using application specific runtime environments rather then general runtime environments are achieved for each executable application.

The Application Provisioning System 1100 comprises an External Interface 1110, a Provisioning Server 1120, a Repository 1130, and a Processor Array 1140. The Provisioning Server 1120 is in communication with the External Interface 1110, the Repository 1130, and the Processor Array 1140.

External Interface 1110 is configured for an end user or an administrator to request execution of one or more of Executable Applications 162A-162D. For example, in some embodiments, External Interface 1110 includes a network interface configured to receive commands from remote user clients, and an administrative terminal configured for use by an administrator of Application Provisioning System 1100. Typically, Application Provisioning System 1100 is configured to support a variety of different Executable Applications 162A-162D and to execute these Executable Applications 162A-162D in parallel. In some embodiments, External Interface 1110 is configured for a user to request creation of a virtual machine including an image of the application specific runtime environment.

Repository 1130 is configured to store a plurality of application environment specifications and resources required by Executable Applications 162A-162D according to these specifications. Repository 1130 is optionally further configured to store one or more virtual machine specification and/or application specific runtime environment images, each associated with an executable application and/or an application environment specification. A single copy of a resource stored in Repository 1130 may be used by several different Executable Applications 162A-162D. Repository 1130 may include hard drives, optical drives, and/or other types of memory. Repository 1130 is optionally distributed among more than one device. Repository 1130 is optionally includes embodiments of Resource Repository 530 and Application Environment Specification Storage 560. In some embodiments, Repository 1130 is configured to further store executable applications, e.g., Executable Applications 162B.

Provisioning Server 1120 is configured to execute Executable Applications 162A-162D in response to commands received from External Interface 1110. For example, Provisioning Server 1120 is configured to receive a request for execution of Executable Application 162B, to provision an application specific runtime environment for Executable Application 162B according to an associated application environment specification, and to execute Executable Application 162B in the provisioned application specific runtime environment. The execution of Executable Application 162B typically occurs on Processor Array 1140. Provisioning Server 1120 optionally includes an embodiment of Computing System 510. Provisioning Server 1120 is optionally distributed among more than one device. In some embodiments, Provisioning Server 1120 is configured to generate an image of an application specific runtime environment. One or more of these images may be stored in Repository 1130 prior to use.

In some embodiments, Processor Array 1140 includes one or more Processor Nodes 1150, each configured to support execution of at least one application specific runtime environment. Processor Array 1140 is optionally distributed among more than one device. In some embodiments, Processor Array 1140 includes a rack and a plurality of processing blades. In some embodiments, Processing Array 1140 includes a one or more virtual machines. In these embodiments, the one or more Processing Nodes 1150 may be virtual machines or may include a virtual machine. In alternative embodiments, Provisioning Server 1120 is configured to provision an application specific runtime environment on a Processor Node 1150 that is not part of a processor array. This Processor Node 1150 may include, for example, a single application server. In these embodiments, Processor Array 1140 is optional.

In some embodiments, Application Provisioning System 1100 includes a Virtual Machine Manager 1160. Virtual Machine Manager 1160 is configured to create a virtual machine container within Processor Array 1140. This virtual machine container is optionally created using a virtual machine specification developed using any of the techniques discussed elsewhere herein. Virtual Machine Manager 1160 is optionally further configured to load an image of the application specific runtime environment generated by Provisioning Server 1120 into the virtual machine container.

In some embodiments, Virtual Machine Manager 1160 is configured to create a virtual machine having characteristics adjusted to more optimally fit the requirements of an executable application. These characteristics are optionally adjusted by considering the resources required by the executable application as identified in the associated application environment specification. For example, the virtual machine may be defined using information included in the application environment specification. In some embodiments, the application environment specification includes information regarding the memory needed to store required resources during execution and the memory required for the allocation of variables and the like during execution. Use of this information allows creation of a virtual machine that includes characteristics that are tuned for a specific executable application. The tuned virtual machine is more resource efficient than would be possible without this information. In some embodiments, the virtual machine is provisioned. For example, in some embodiments, Virtual machine manager 1160 and/or Provisioning Server 1120 are configured to determine an amount of memory to include in a virtual machine based on memory requirements included in the application environment specification.

In some embodiments, Virtual Machine Manager 1160 is configured to automatically create the virtual machine environment in response to a request to execute the executable applications. In some embodiments, Virtual Machine Manager 1160 comprises virtual machine management software available from VMware, Inc. Virtual Machine Manager 1160 is optionally configured to support a plurality of virtual machines simultaneously on Processor Array 1140, and as such support the execution of a plurality of different executable applications and/or copies of the same executable application.

During execution of the Executable Application 162B, communication between External Interface 1110 and the Executable Application 162B may occur through Provisioning Server 1120, through Virtual machine Manager 1160, and/or directly between External Interface 1110 and Processor Array 1140.

In various embodiments, Application Provisioning System 1100 is configured for installation and execution of an operating system within one or more of Processing Nodes 1150 or some other target platform. This operating system is optionally configured to execute within the specific hardware and/or software environment of the member of Processing Nodes 1150 on which it is installed. For example, the operating system may include drivers specific to hardware included in Processing Nodes 1150.

In various embodiments, Repository 1130 is further configured to store a representation and/or resources of the operating system for execution on Processing Nodes 1150. The representation of the operating system may include a grouping of individual files and a disk image. This disk image is optionally compressed and may be configured for the specific hardware environment of Processing Nodes 1150. For example, the disk image may be generated by installing the operating system on a hardware and software environment similar or identical to that of Processing Nodes 1150 and storing a copy of the installed operating system in Repository 1130. Resources of the operating system include files, data, scripts, and/or the like from which the representation of the operating system may be constructed. For example, these resources may include libraries and installation scripts. Repository 1130 may also be configured to store resources associated with independent applications and/or resources associated with an operating system.

In some embodiments, installation of the operating system on Processing Nodes 1150 is accomplished faster than if the operating system is stored in a non-executable form. The executable form is distinguished from non-executable forms in that the executable form can be executed or booted without significant further installation. For example, decisions relating to operating system configuration and/or hardware environment that are normally made during the installation process have typically already been made in the executable form. The executable form is, therefore, optionally configured for a specific hardware environment and/or a specific operating system configuration. The executable form can typically be executed without further hardware discovery.

In some embodiments, Provisioning Server 1120 is configured to automatically generate an operating system representation and to automatically provide the generated operating system representation to the target platform, in response to a request for operating system installation. For example, in response to a request of installation of the operating system, resources stored on Repository 1130 may be used to generate a compressed disk image of the operating system. This disk image includes an installed version of the operating system that may be conveyed to the target platform via a computing network. Provisioning Server 1120 is optionally further configured to generate a plurality of representations of the operating system, each of the plurality of representations including a different configuration of the operating system and/or configured for execution on a different target platform. Each member of this plurality of representations is optionally stored on Repository 1130.

An operating system configuration may include a resource allocation or specific features. For example, a first operating system configuration may include a debug utility while a second configuration of the same operating system may not include the debug utility. In another example, in embodiments where the operating system includes the ESX operating system available from VMware, Inc., a first configuration may have a console operating system size of 272 MB and be configured to support 16 instances of Virtual Machine Container 940, and a second configuration may have a console operating system size of 192 MB and be configured to support 8 instances of Virtual Machine Container 940. These two configurations have different allocations of a resource, e.g., storage.

Repository 1130 is optionally further configured to store a decompressor and/or a configuration file. The decompressor is configured to decompress the operating system image on Processing Nodes 1150 after it has been compressed by Provisioning Server 1120. The configuration file is optionally compressed and is configured to characterize the operating system representation. The configuration file is used by the operating system while executing on Processing Nodes 1150. In some embodiments, the configuration file includes an ESX.config file configured to be used by the ESX operating system in order to configure SCSI drives, a number of Ethernet cards, and/or the like. The decompressor and/or the configuration file are optionally included in the operating system image.

Provisioning Server 1120 is optionally further configured for transferring the operating system image generated in response to a received request, the decompressor, and/or the configuration file from Repository 1130 to members of Processing Nodes 1150 or some other target platform. In some embodiments, Provisioning Server 1120 is configured to determine the specific hardware environment of a target platform prior to transferring the compressed image to the target platform. In these embodiments, the determined specific hardware environment may be used to select the appropriate resources (e.g. hardware drivers) from Repository 1130 for a specific target platform and include them into the created operating system representation.

In some embodiments, members of Processing Nodes 1150 include more than one logical partition. A logical partition may include, for example, a hard drive divided into two separately addressable storage areas. In these embodiments; a first logical partition is configured to receive the operating system image and a second logical partition includes the specific environment, e.g. target platform, for which the operating system image is configured. Installation of the operating system is optionally accomplished by copying the operating system image to the first logical partition as a compressed file and then decompressing the operating system image into the second logical partition.

Figure 12:
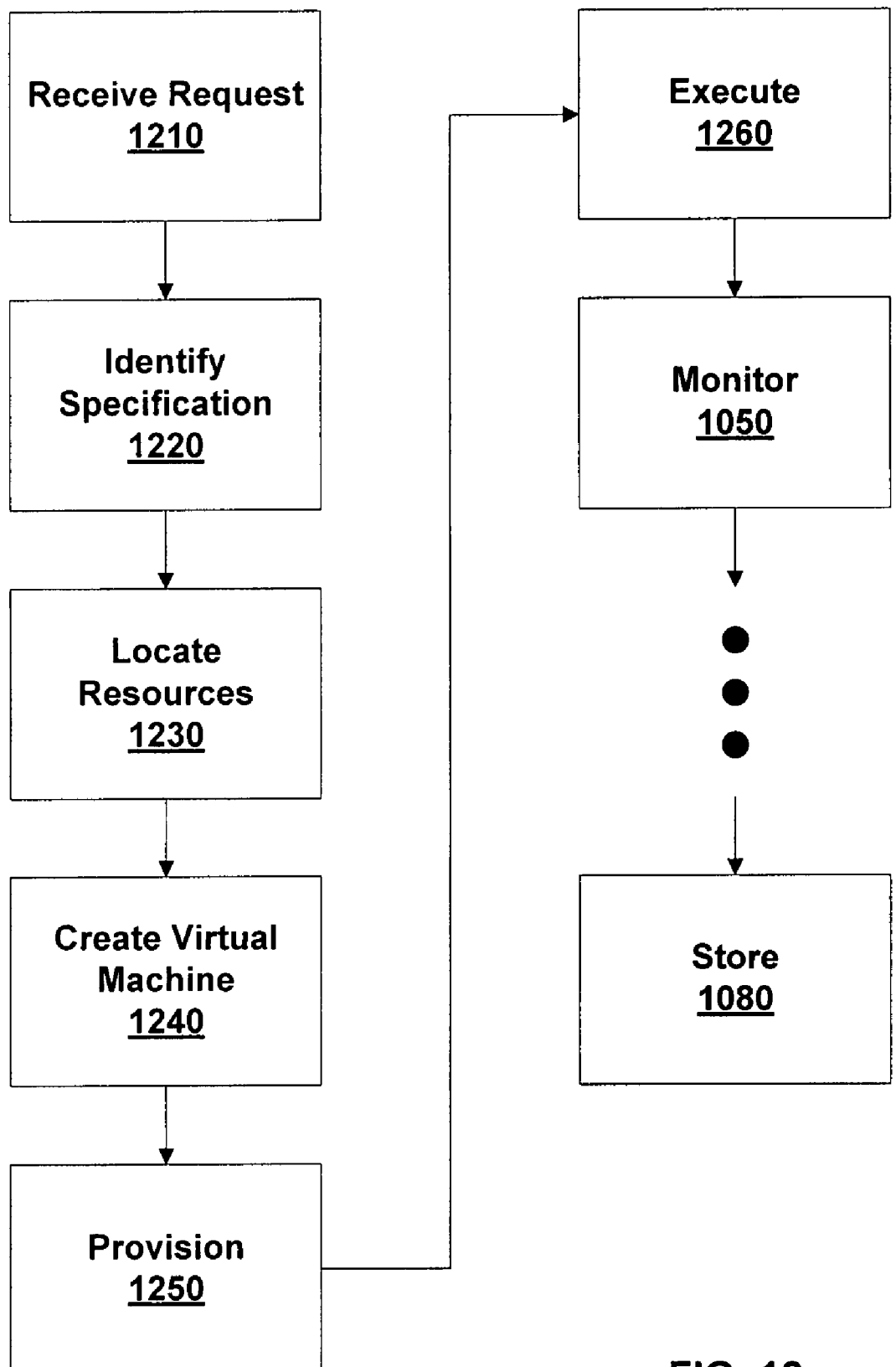
FIG. 12 illustrates a method of executing an executable application using the application provisioning system illustrated in FIG. 11, according to various embodiments.

FIG. 12 illustrates a method of executing Executable Application 162B using the Application Provisioning System 1100 illustrated in FIG. 11, according to various embodiments. In these methods, an application specific runtime environment is provisioned in response to a request to execute one or more of Executable Applications 162A-162D. The requested Executable Applications 162A-162D is executed within the application specific runtime environment. Optionally, the application specific runtime environment is modified in response to information learned by executing the requested member of Executable Application 162A-162D. The steps illustrated in FIG. 12 are optionally performed in real-time. For example, in some embodiments, an end user can request execution of one of Executable Applications 162A-162D and be using the Executable Application 162A-162D without an unreasonable delay.

Specifically, in a Receive Request Step 1210, a request is received from an end user or an administrator for the execution of Executable Application 162B. This request is received by Provisioning Server 1120 via External Interface. 1110. The user may make the request by clicking an icon associated with Executable Application 162B or by entering a name of Executable Application 162B on a command line.

In an Identify Specification Step 1220, Provisioning Server 1120 is used to identify an application environment specification associated with Executable Application 162B. The application environment specification may be stored in Repository 1130 or elsewhere accessible to Provisioning Server 1120. If an application environment specification is not found, Computing System 510 is optionally used to generate the application environment in real-time.

In a Locate Resources Step 1230, Provisioning Server 1120 uses the information within the application environment specification to identify and locate the resources required by Executable Application 162B. Typically, Provisioning Server 1120 is first configured to look for these resources in Repository 1130.

In an optional Create Virtual Machine Step 1240, a virtual machine is created within one of Processor Nodes 1150. Characteristics of the virtual machine are optionally selected based on information within the application environment specification. For example, resources included within the virtual machine may be selected to optimally meet the requirements of Executable Application 162B. Create Virtual Machine Step 1240 is optional when the application specific runtime environment is provisioned on a physical rather than a virtual machine.

In a Provision Step 1250, the application specific runtime environment is provisioned within one of Processor Nodes 1150. Typically, provisioning includes copying Executable Application 162B and the resources specified in the application environment specification from Repository 1130 to the provisioned node.

In an Execute Step 1260, Executable Application 162B is executed within the provisioned application specific runtime environment. This execution typically includes communication of commands and data between Executable Application 162B and the end user via External Interface 1110. These commands and data may pass through Provisioning Server 1120 or may pass from Processor Node 1150 to External Interface without passing through Provisioning Server 1120.

Steps 1240 through 1260 are typically performed using Provisioning Server 1120.

As illustrated in FIG. 12, Monitor Step 1050 through Store Step 1080 as illustrated in FIG. 10 are optionally performed during the execution of Executable Application 162B. These steps include Steps 1055, 1060, 1065, 1070 and 1075. Monitor Step 1050 through Store Step 1080 are optionally performed by Provisioning Server 1120 or by an embodiment of Interface Layer 930 included within Processor Array 1140.

A log of events relating to the execution of Executable Application 162B is optionally generated by Provisioning Server 1120 and/or Processor Nodes 1150. This log may be stored in Repository 1130.

Figure 13:
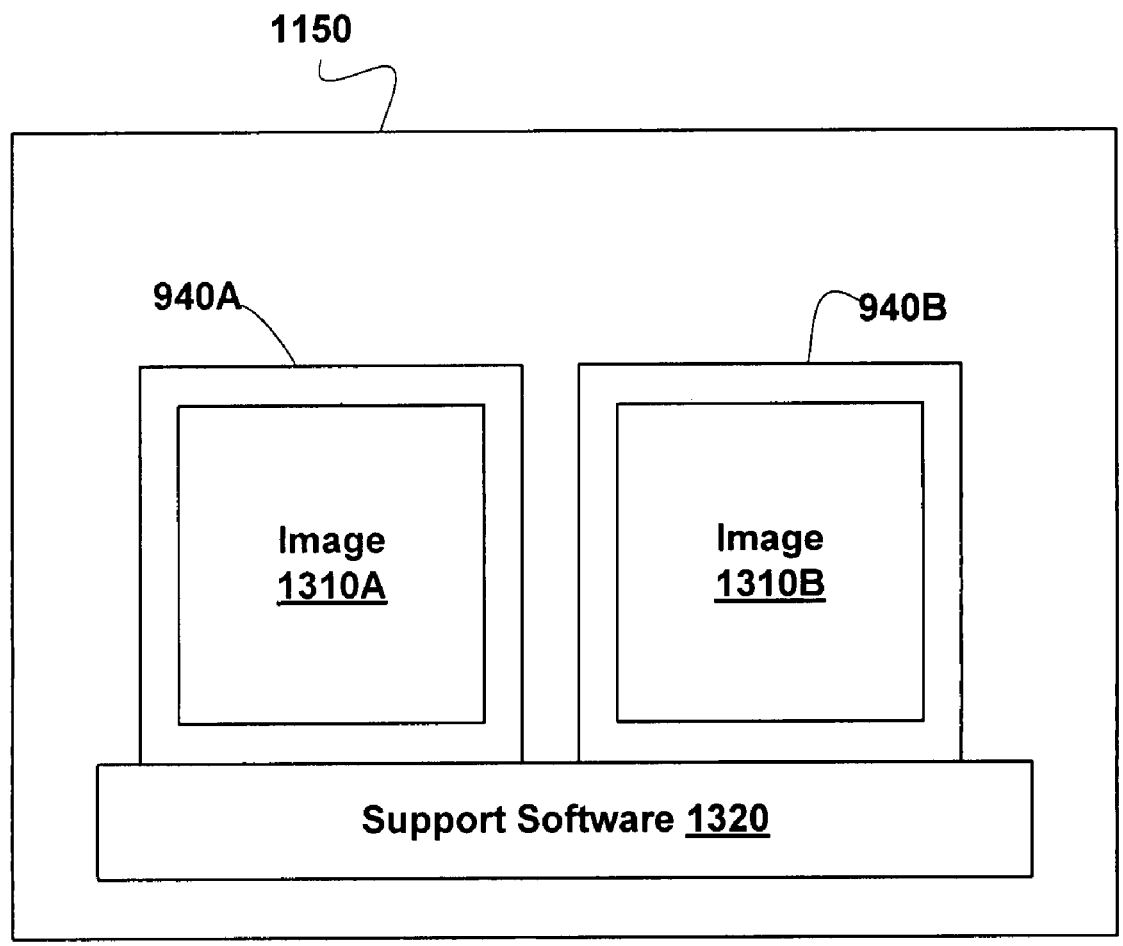
FIG. 13 is a block diagram illustrating application specific runtime environments installed within virtual machine containers, according to various embodiments.

FIG. 13 is a block diagram illustrating Images 1310A and 1310B of application specific runtime environments installed within Virtual Machine Containers 940A and 940B, respectively, according to various embodiments. Images 1310A and 1310B are embodiments of the application specific runtime environments discussed elsewhere herein. Virtual Machine Containers 940A and 940B are optionally maintained on the same Member 1150A of Processing Nodes 1150. Virtual Machine Containers 950A and 950B typically appear to be independent hardware devices from the point of view of Images 1320A and 1310B. Virtual Machine Containers 940A and 940B are optionally created using Virtual Machine Manager 1160 (FIG. 11).

The operation of Virtual Machine Containers 940A and 940B is supported by Support Software 1320. Support Software 1320 optionally includes VMware ESX, VMware Workstation, VMware server, or the like, and is optionally configured for multiple Virtual Machines 940 to operate on the same hardware.

Figure 14:
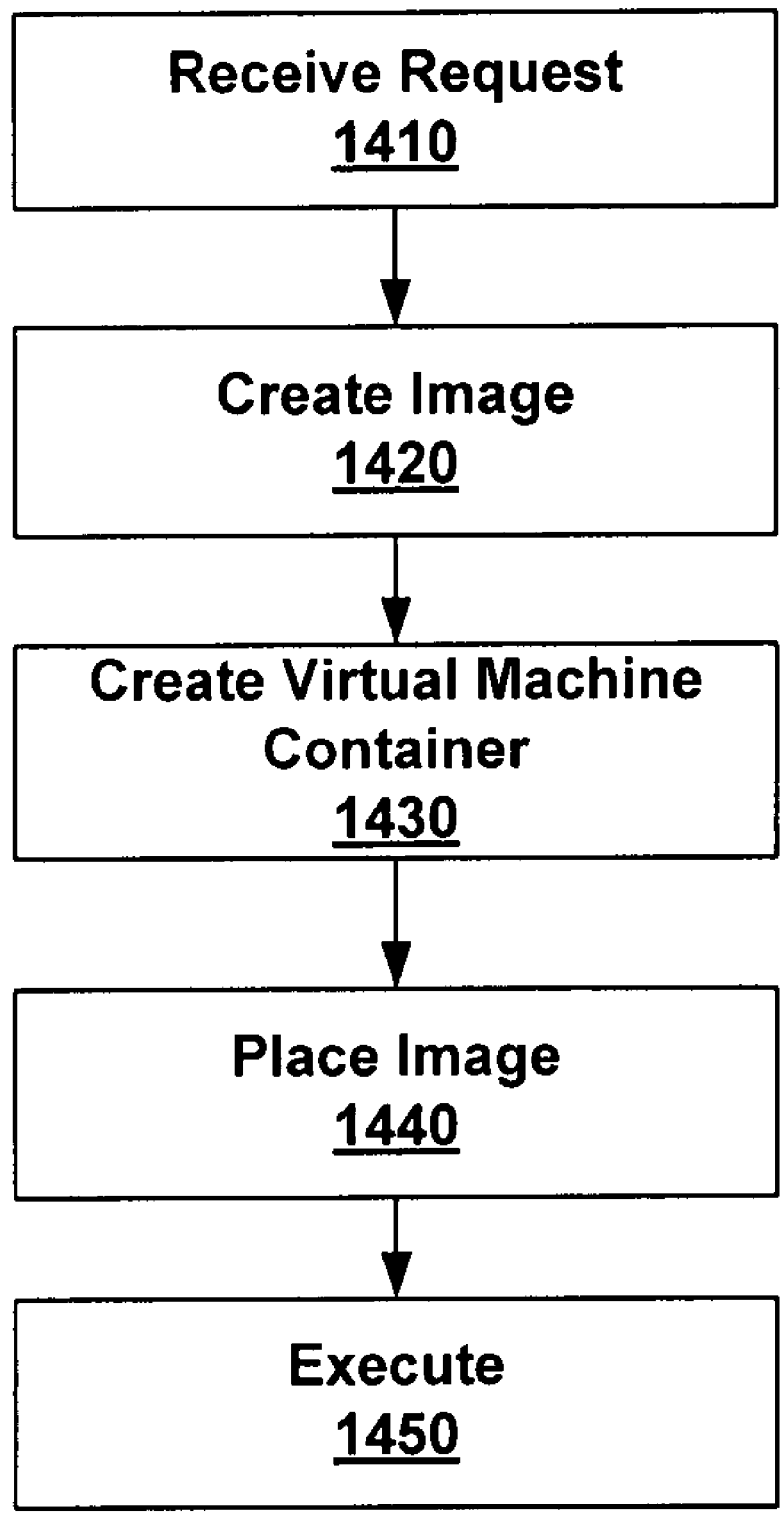
FIG. 14 illustrates a method of generating a virtual machine including an application specific runtime environment, according to various embodiments of the invention.

FIG. 14 illustrates a method of generating a virtual machine including a virtual machine container and an application specific runtime environment. In this method an image of an application specific runtime environment is placed with a virtual machine container and the executable application represented by the image is optionally executed. Any one or more of the steps illustrated in FIG. 14 are optionally performed automatically. Steps of FIG. 14 are optionally performed in parallel in order to create multiple virtual machines configured to execute different executable applications and/or multiple copies of the same executable application.

In a Receive Request Step 1410, a request is received from an administrator or a user. This request is optionally received via External Interface 1110 (FIG. 11) and may be to execute the executable application or to merely create the provisioned virtual machine. For example, in some embodiments, a request to create an executable application will result in automatic generation of a virtual machine configured for execution of the executable application.

In an optional Create Image Step 1420, an image of the application specific runtime environment is created using an application environment specification. The creation of application runtime environments, and images thereof, is discussed elsewhere herein, for example, with respect to FIGS. 6, 8, 10 and 12. Create Image Step 1420 is optional wherein the image has been previously created and stored. For example, the image may be previously stored in Repository 1130.

In a Create Virtual Machine Container Step 1430, a virtual machine container configured for executing an executable application is created. This virtual machine container may be, for example, Virtual Machine Container 940A. Create Virtual Machine Step 1430 is optionally performed using Virtual Machine Manager 1160. Create Virtual Machine Step 1430 is optionally performed automatically in response to a request to execute the executable application. Create Virtual Machine Container Step 1430 is optionally based on information gathered while generating an application environment specification and stored in a virtual machine specification. This information may be gathered using, for example, the methods illustrated in FIG. 6, 8 or 10. This information may include, for example, an estimated amount of total memory and/or working memory required to execute the executable application, the size of the hard disk required, the necessary hardware (e.g. sound cards, floppy drives) required to execute the application, and/or the like. In some embodiments, the virtual machine specification is stored in an application environment specification and/or Repository 1130.

In a Place Image Step 1440, the image of the application specific runtime environment created in Create-Image Step 1420, or a previously stored image, is placed in the virtual machine container created in Create Virtual Machine Container Step 1430. Place Image Step 1440 is optionally automatic and may be performed simultaneously with Create Virtual Machine Step 1430, e.g. the virtual machine container may be created and filled as part of a single process.

In an optional Execute Step 1450, the executable application is executed within the Virtual Machine Container 940A. The method illustrated in FIG. 14 is optionally used to execute a plurality of different executable applications and/or multiple copies of the same application.

In various embodiments, one or more of Executable Applications 162A-162D includes an operating system. This operating system may or may not be configured in an application specific environment. For example, at the time the operating system is installed, if the features of the operating system that will be later needed are unknown, then a non-specific version of the operating system is typically installed. If those applications that the operating system will be used to support are known at the time the operating system is installed, then an application specific version of the operating system may be generated and executed using the systems and methods described elsewhere herein. For example, if the operating system will be used to support a plurality of Virtual Machine Containers 940 each including a predetermined Executable Application 162B, then an application specific version of the operating system may be installed. The application specific version of the operating system may include operating system subsystems selected by a user.

Figure 15:
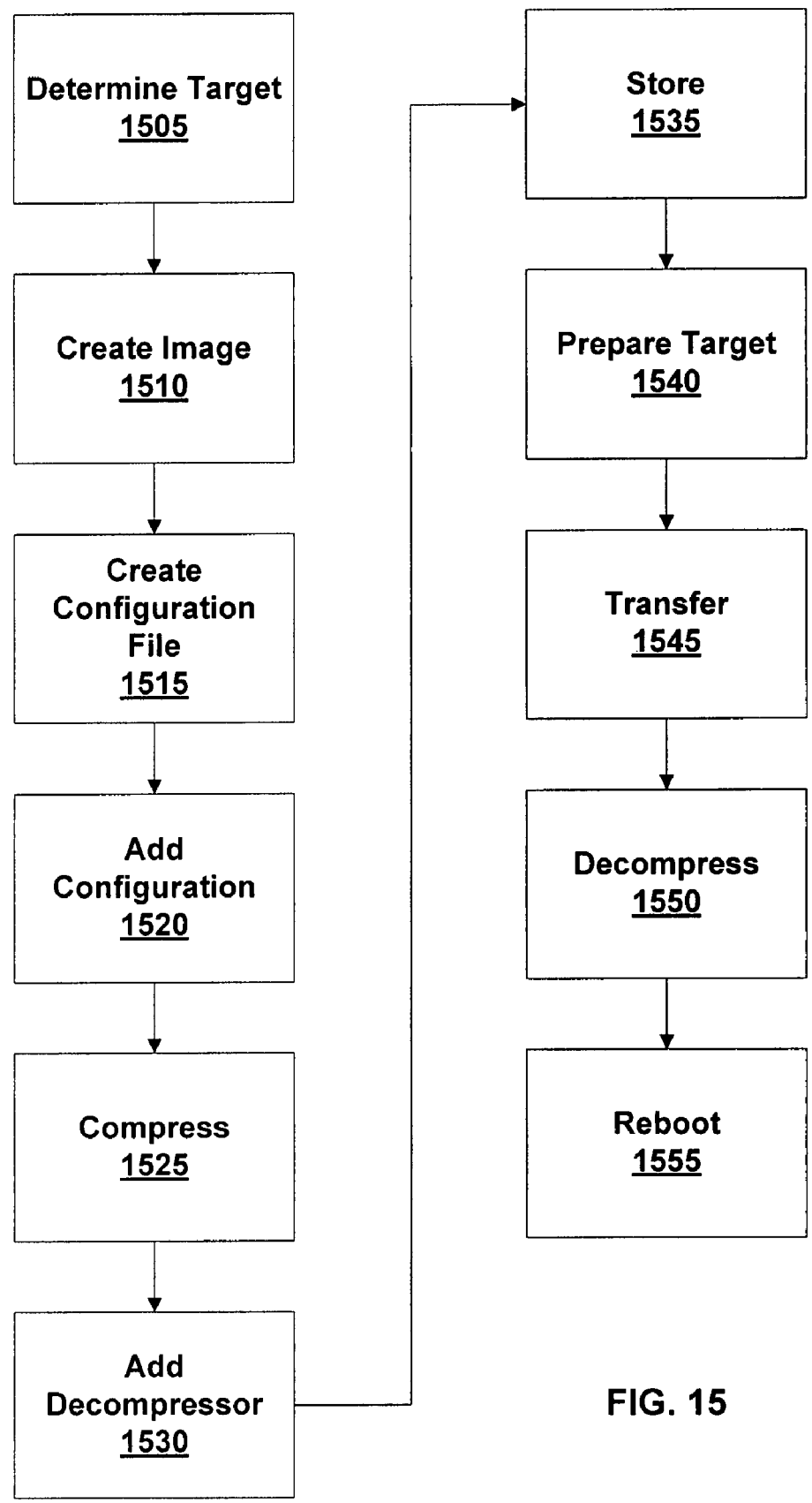
FIG. 15 illustrates methods of creating the image of an operating system and installing the created image on a target platform, according to various embodiments of the invention.

FIG. 15 illustrates methods of creating the image, or other representation, of an operating system and installing the created image on a target platform, according to various embodiments of the invention. Those steps involved in creation of the operating system representation are optionally performed independently and separately from those steps involved in installation of the operating system on the target platform. Thus, steps involved in creation of the operating system representation or installation of the operating system may be optional.

Typically, the created representation includes an executable form of the operating system characterized by a specific operating system configuration and/or configured for installation on a specific predetermined set of hardware and/or software resources. These resources may include physical hardware devices, virtual hardware devices, user determined allocations of memory, communication channels, processors, etc., and/or the like. For example, the operating system representation may be configured to support predetermined types of input/output devices, logical storage devices, communication devices, memory sizes, and/or the like. As used herein, the term predetermined resources is meant to indicate resources that are determined before the operating system is installed on a target platform.

Installation of the operating system representation includes transferring the operating system representation to the target platform. The operating system representation may comprise one, two or more files. The operating system representation may be decompressed on the target platform to generate an executable installation of the operating system. In some embodiments, the decompressed operating system representation is configured to be bootable without requiring further installation.

In an optional Determine Target Step 1505, a target platform for installation of the operating system is determined using Provisioning Server 1120. This target platform may include an existing physical device or may include a specification of a physical device. Determination of the target platform typically includes examination of the target platform and/or generating a list of resources to be supported on the target platform. For example, in some embodiments the determination includes identification of communication devices available on the target platform or a number of virtual machine containers 940 to be supported by the operating system.

In some embodiments, Determine Target Step 1505 is performed using a software agent configured to probe the characteristics of a target platform, e.g., perform hardware discovery, over a computing network. For example, Provisioning Server 1120 may be configured to provide a software agent to members of Processing Nodes 1150. The software agent may be configured to examine the physical characteristics of Processing Nodes 1150 and to report these physical characteristics back to Provisioning Server 1120. In some embodiments, this software agent is itself an operating system that generates a machine specific configuration file. In these embodiments, completely installing the desired operating system requires two separate boot processes in this embodiment.

In a Create Image Step 1510, an image, or other representation, of the operating system in an executable form is created. This representation is generally created in response to a request for installation of the operating system on a target platform. For example, the representation may be created by Provisioning Server 1120 based on a request received via External Interface 1110. For example, an installation utility may be used to install the operating system on a replica of the target platform, in order to extract meta information for proper operating system configuration. This installation utility is optionally part of Provisioning Server 1120. The installation utility is optionally configured to examine the platform on which the installation is taking place and adapt the installation to the resources available on this platform. The installation utility is optionally further configured to query a user regarding further installation options, e.g., whether or not to include a debug utility or other operating system subsystems in the installation. The representation of the operating system is generally generated using resources, e.g., libraries, scripts and/or other files, stored in Repository 1130. The representation of the operating system is typically based on the target platform determined in Determine Target Step 1505.

In an optional Create Configuration File Step 1515, a configuration file for use with the operating system representation created in Create Image Step 1510 is created. The configuration file may include characteristics of the target platform. These characteristics can include, for example, an amount of memory to use, boot parameters, communication addresses, pointers to files, and/or the like. In some embodiments, this configuration file is generated dynamically using a separate boot process, such that installing the desired operating system requires two separate boot processes. In some embodiments the created configuration file is an ESX.config file for use with the ESX operating system.

In an Add Configuration Step 1520, the configuration file created in Create Configuration File Step 1515 is added to the representation of the operating system created in Create Image Step 1510. As discussed elsewhere herein, the representation of the operating system can include one or more files. In some embodiments the configuration file is included in the same image file as other parts of the operating system representation, and in some embodiments, the configuration file is stored in a separate file of the operating system representation. In some embodiments, the configuration file is added to the installed operating system and an image of both the installed operating system and the configuration file is generated by making a copy of both together.

In an optional Compress Step 1525, the operating system representation created in Create Image Step 1510 and/or the configuration file created in Create Configuration File Step 1515 are compressed. In some embodiments, part of the operating system representation is compressed and part of the operating system representation is not compressed. This compression is performed using compression techniques known in the art.

In an optional Add Decompressor Step 1530, a decompression utility is added to the operating system representation. This decompression utility is configured to decompress those parts of the operating system representation compressed in Compress Step 1525. Typically, the decompression utility is stored in a file separate from other parts of the operating system representation. Add Decompressor Step 1530 is optional in embodiments wherein the operating system representation is not compressed or a decompressor is available at the target platform.

In an optional Store Step 1535, the operating system representation is stored for later use. This storage may be within Repository 1130.

In an optional Prepare Target Step 1540, a target platform is prepared for installation of an operating system. This preparation can include, for example, installation of network communication drivers and logical partitioning of a storage device into separate drives. The communication drivers may be used to receive the representation of the operating system prepared using other steps illustrated in FIG. 15. For example, the communication drivers may be used to receive the operating system representation from Repository 1130 or Provisioning Server 1120 over a computing network.

In some embodiments, Prepare Target Step 1540 includes preparation of a first logical partition configured to receive the compressed operating system representation and a second logical partition including the target platform. The first logical partition is optionally smaller in size than the second partition. For example, in various embodiments the second logical partition is at least 3, 5 or 10 times larger than the first logical partition. Prepare Target Step 1540 is optional in embodiments wherein the target platform is already prepared for operating system installation. In some embodiments, Prepare Target Step 1540 includes determining the hardware resources of the target platform and confirming that the representation is compatible with the determined hardware resources.

In a Transfer Step 1545, the operating system representation is transferred to the target platform or to a logical partition configured to receive the operating system. In some embodiments, the operating system representation is transferred from Repository 1130 to Processor Array 1140 using Provisioning Server 1120. In some embodiments, the operating system representation is transferred by copying the operating system representation to a portable storage device such as a portable hard drive, a static memory stick, an optical compact disk, or the like, and then connecting the portable storage device to the target platform. In some embodiments, the operating system representation is transferred using a computing network.

Transfer Step 1545 optionally includes selecting the operating system representation from among a plurality of operating system representations. For example, one of the plurality of operating system representations may be selected based on characteristics of the target platform determined in Determine Target Step 1505. As such, an operating system representation can be selected to match the characteristics of the target platform.

In an optional Decompress Step 1550, the operating system representation is decompressed. This decompression is performed using the decompression utility added to the operating system representation in Add Decompressor Step 1530 or may be performed using a decompression utility stored elsewhere. The operating system representation is optionally decompressed from a first logical partition to a second logical partition. For example, in some embodiments, the first logical partition is configured to receive and store the compressed operating system representation and the operating system is decompressed into the second logical partition, the second logical partition including the target platform. Decompress Step 1550 is not required in embodiments wherein the operating system representation is not compressed. The decompressor is optionally configured to be executed remotely over a computing network.

In an optional Reboot Step 1555, the target platform is rebooted. Typically the operating system representation is placed in the target platform such that the booting sequence of the target platform will invoke, e.g., execute, the operating system.

Several embodiments are specifically illustrated and/or described herein. However, it will be appreciated that modifications and variations are covered by the above teachings and within the scope of the appended claims without departing from the spirit and intended scope thereof. For example, the methods disclosed herein may be accomplished using computing instructions stored on computer readable media. In some embodiments, a plurality of images may be placed in a virtual machine container. One or more of these images may represent an application specific runtime environment. One or more of these images may represent general runtime environments. While the discussion herein of embodiments that are related to installation of an operating system are discussed with references to the system of FIG. 9, these references are made for the purposes of example. The systems and methods of installing an operating system that are discussed herein may be separate and independent of systems configured to install other applications.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A system comprising:
   a processing node configured to support execution of an operating system on a target platform;
   a repository configured to store software resources and a configuration file, the configuration file configured for use during execution of the operating system on the target platform and including characteristics of one or more resources supported by the target platform; and
   a provisioning server configured for:
   generating a representation of the operating system using at least one software resource stored in the repository, the representation in a compressed form and specific to the characteristics of the one or more resources supported by the target platform; and
   transferring the representation and the configuration file to the processing node over a computing network, wherein the configuration file is used by the operating system while executing on the processing node to configure the one or more resources included in the characteristics of the configuration file for the target platform.

2. The system of claim 1, further comprising a virtual machine manager configured to create a virtual machine container on the processing node, the virtual machine container being supported by the operating system.

3. The system of claim 1, wherein the provisioning server is further configured to generate a plurality of representations of the operating system, each of the plurality of representations being configured for execution on a different target platform, wherein the plurality of representations of the operating system are different based on different resources supported by different target platforms.

4. The system of claim 1, wherein the provisioning server is further configured to generate a plurality of representations of the operating system, each of the plurality of representations including a different configuration of the operating system.

5. The system of claim 1, wherein the repository is further configured to store a plurality of representations of the operating system, each of the plurality of representations including a different configuration of the operating system.

6. The system of claim 1, wherein the representation of the operating system includes an uncompressed representation of the configuration file.

7. The system of claim 1, wherein the provisioning server is further configured to determine the target platform prior to generating the representation of the operating system.

8. The system of claim 1, wherein the processing node includes a first logical partition configured to receive the representation of the operating system and a second logical partition including the target platform, wherein the operating system is configured to be installed on the second logical partition.

9. The system of claim 1, wherein the provisioning server is configured to generate the representation of the operating system in response to a request to install the operating system on the target platform.

10. The system of claim 1, wherein the repository is further configured to store an application environment specification and a resource required by an executable application configured for execution on the operating system, wherein:
the application environment specification is configured to be used to generate an application specific runtime environment specific to the executable application and in which the executable application is executed, and
the representation of the operating system is configured to be specific to the executable application and the configuration file is configured to be used by the operating system to configure the resource while executing on the target platform.

11. A method comprising:
creating a representation of an operating system in an executable form, in response to a request for installation of the operating system on a target platform, wherein the operating system is created for a specific predetermined set of resources supported by the target platform;
creating a configuration file configured for use by the operating system within a the specific predetermined set of resources of the target platform, the configuration file including characteristics of the specific predetermined set of resources supported by the target platform;
adding the configuration file to the representation of the operating system;
compressing the representation of the operating system; and
transferring the compressed representation of the operating system to the target platform, wherein the configuration file is used by the operating system while executing on the target platform to configure the specific predetermined set of resources included in the characteristics of the configuration file for the target platform.

12. The method of claim 11, wherein the representation of the operating system includes a disk image.

13. The method of claim 11, further including storing the compressed representation of the operating system in a repository.

14. The method of claim 11, further including adding a decompressor to the representation of the operating system, the decompressor configured to decompress the representation of the operating system.

15. The method of claim 14, wherein the decompressor is configured to decompress the representation of the operating system from a first logical disk partition to a second logical disk partition.

16. The method of claim 14, wherein the decompressor is configured to be executed remotely over a computing network.

17. The method of claim 14, wherein the decompressor is configured to receive part of the representation of the operating system over a computing network.

18. The method of claim 11, wherein the specific predetermined set of resources includes a specific hardware configuration.

19. The method of claim 11, wherein the specific predetermined set of resources includes a specific resource allocation.

20. The method of claim 11, wherein the representation of the operating system is configured to have a specific console operating system size prior to installation of the operating system on the target platform.

21. The method of claim 11, wherein the configuration file is configured for operation of the operating system without further hardware discovery.

22. The method of claim 11, further comprising:
preparing a target platform to receive the operating system;
transferring the representation of the operating system to a processing node including the target platform; and
decompressing the representation of the operating system on the target platform.

23. The method of claim 22, wherein preparing the target platform includes dividing a storage device into a plurality of logical partitions, wherein a first logical partition in the plurality of logical partitions is configured to receive the representation of the operating system and a second logical partition includes the target platform wherein the operating system is configured to be installed on the second logical partition.

24. The method of claim 22, wherein preparing the target platform includes installing support for communication of the representation of the operating system over a computing network.

25. The method of claim 22, wherein preparing the target platform includes determining resources of the target platform and confirming that the representation of the operating system is compatible with the determined resources.

26. The method of claim 22, wherein transferring the representation of the operating system is performed using a computing network.

27. The method of claim 22, wherein transferring the representation of the operating system is performed using a portable storage device.

28. The method of claim 11, further including determining the set of resources by examining the target platform prior to creating the representation of the operating system.

29. The method of claim 11, wherein the representation of the operating system is configured to support a plurality of virtual machines.

30. The method of claim 11, further comprising sending an agent to the processing node to determine the set of resources supported by the target platform, wherein the set of resources are used to generate the configuration file.

31. The method of claim 11, further comprising:
installing the operating system on a replica of the target platform; and
adapting the representation of the operating system to the set of resources of the replica of the target platform.

32. A method comprising:
creating a representation of an operating system in an executable form, in response to a request for installation of the operating system on a target platform;
creating a configuration file configured for use by the operating system within a specific predetermined set of resources of the target platform;
adding the configuration file to the representation of the operating system;
compressing the representation of the operating system; and
transferring the compressed representation of the operating system to the target platform,
wherein:
compressing the representation of the operating system is performed prior to the step of adding the configuration file to the representation of the operating system, and after adding the configuration file to the representation of the operating system, the representation of the operating system includes a first part that is compressed and a second part that is not compressed.

33. A method comprising:

requesting a representation of an operating system in an executable form for installation at a target platform;

receiving the representation of the operating system, wherein the representation of the operating system is specific to a set of resources supported by the target platform, the representation being compressed;

receiving a configuration file configured for execution of the operating system within the target platform, the configuration file including characteristics of the set of resources supported by the target platform;

decompressing the representation of the operating system into the target platform; and executing the operating system on the target platform to configure the one or more resources included in the characteristics of the configuration file for the target platform.

34. The method of claim 33, further including determining the set of resources of the target platform and selecting the representation of the operating system based on the determined set of resources.

35. The method of claim 33, wherein the operating system is configured to support a plurality of virtual machines.

36. The method of claim 35, wherein a maximum number of the plurality of virtual machines is determined during generation of the representation of the operating system.

37. The method of claim 33, further comprising:

storing the compressed operating system in a first logical partition of a processing node; and storing the decompressed operating system in a second logical partition, the second logical partition including the target platform.

38. The method of claim 33, wherein:

the operating system is installed on the target platform during a first boot process; and the operating system configures the one or more resources using the configuration file during a second boot process.

* * * * *